(12) United States Patent
Jalbert et al.

(10) Patent No.: US 7,424,615 B1
(45) Date of Patent: Sep. 9, 2008

(54) MUTUALLY AUTHENTICATED SECURE KEY EXCHANGE (MASKE)

(75) Inventors: Christopher P. Jalbert, Gilroy, CA (US); Leland A. Wallace, San Jose, CA (US); David M. O'Rourke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 717 days.

(21) Appl. No.: 09/918,602

(22) Filed: Jul. 30, 2001

(51) Int. Cl.
*H04L 9/00* (2006.01)
*H04K 1/00* (2006.01)
(52) U.S. Cl. .................. 713/171; 713/169; 380/44; 380/283
(58) Field of Classification Search ................ 713/169, 713/171; 380/283, 44
See application file for complete search history.

(56) References Cited

U.S. PATENT DOCUMENTS

| | | | |
|---|---|---|---|
| 4,200,770 A | 4/1980 | Hellman et al. | |
| 4,956,863 A * | 9/1990 | Goss | 380/30 |
| 5,241,599 A * | 8/1993 | Bellovin et al. | 713/171 |
| 5,515,441 A | 5/1996 | Faucher | |
| 5,666,415 A * | 9/1997 | Kaufman | 713/159 |
| 5,673,322 A | 9/1997 | Pepe et al. | |
| 5,696,880 A | 12/1997 | Gustafson et al. | |
| 5,729,608 A * | 3/1998 | Janson et al. | 713/171 |
| 5,742,845 A | 4/1998 | Wagner | |
| 5,754,659 A | 5/1998 | Sprunk et al. | |
| 5,793,866 A | 8/1998 | Brown et al. | |
| 5,796,833 A | 8/1998 | Chen et al. | |
| 5,822,434 A | 10/1998 | Caronni et al. | |
| 5,835,726 A | 11/1998 | Shwed et al. | |
| 5,896,455 A | 4/1999 | Vanstone et al. | |
| 5,937,422 A | 8/1999 | Nelson et al. | |
| 5,953,420 A | 9/1999 | Matyas, Jr. et al. | |
| 5,953,424 A * | 9/1999 | Vogelesang et al. | 713/169 |
| 5,966,441 A | 10/1999 | Calamera | |
| 5,987,131 A | 11/1999 | Clapp | |
| 6,047,072 A * | 4/2000 | Field et al. | 380/283 |
| 6,064,736 A * | 5/2000 | Davis et al. | 713/155 |
| 6,085,320 A * | 7/2000 | Kaliski, Jr. | 713/168 |

(Continued)

OTHER PUBLICATIONS

Schneier, Bruce. Applied Cryptography. John Wiley & Sons. 1996. Washington DC. pp. 4-5 and 357.*

(Continued)

*Primary Examiner*—Emmanuel L Moise
*Assistant Examiner*—Michael Pyzocha
(74) *Attorney, Agent, or Firm*—Blakely, Sokoloff, Taylor & Zafman LLP

(57) ABSTRACT

The invention provides a cryptographic method which includes receiving at a first entity a second public key $M_A$. At least one of a first session key $K_B$ and a first secret $S_B$ may be generated based on the second public key $M_A$. A first random nonce $N_B$ may be generated which may be encrypted with at least one of the first session key $K_B$ and the first secret $S_B$ to obtain an encrypted random nonce. The encrypted random nonce may be transmitted from the first entity. In response to transmitting the encrypted random nonce, the first computer may receive a data signal containing a modification of the first random nonce $N_B+1$. If the modification of the first random nonce $N_B+1$ was correctly performed, then at least one of (i) opening a communication link at the first computer, and (ii) generating a first initialization vector $I_B$ is performed.

36 Claims, 9 Drawing Sheets

U.S. PATENT DOCUMENTS

| | | | | |
|---|---|---|---|---|
| 6,226,383 | B1* | 5/2001 | Jablon | 380/30 |
| 6,233,608 | B1* | 5/2001 | Laursen et al. | 709/217 |
| 6,263,437 | B1* | 7/2001 | Liao et al. | 713/169 |
| 6,307,938 | B1* | 10/2001 | Matyas et al. | 380/44 |
| 6,539,479 | B1* | 3/2003 | Wu | 713/151 |
| 6,643,774 | B1* | 11/2003 | McGarvey | 713/155 |
| 6,681,017 | B1* | 1/2004 | Matias et al. | 380/277 |
| 6,769,060 | B1* | 7/2004 | Dent et al. | 713/168 |
| 6,775,772 | B1* | 8/2004 | Binding et al. | 713/171 |
| 2001/0042205 | A1* | 11/2001 | Vanstone et al. | 713/171 |
| 2002/0002678 | A1 | 1/2002 | Chow et al. | |

OTHER PUBLICATIONS

Wu, Thomas. The Secure Remote Password Protocol. Nov. 11, 1997. Computer Science Department. Stanford University.*

Menezes, Alfred J. Handbook of Applied Cryptography. CRC Press. 1997. pp. 234-237.*

SNAKE, Simple Network Authenticating Key Exchange, Apr. 1999, pp. 1-4.*

Sun Microsystems, Inc. "The UltraSPARC Processor-Technology: White Paper: The UltraSPARC Architecture", Nov. 14, 1995, 10 pages.

Gursharan S. Sidhu et al. "Inside AppleTalk", Mar. 1989, 4 pages, Addison-Wesley Publishing Company, Inc.

"SPEKE: A Strong Password Method", Oct. 18, 1999, 1 page.

Steven M. Bellovin and Michael Merritt, "Augmented Encrypted Key Exchange: a Password-Based Protocol Secure Against Dictionary Attacks and Password File Compromise", $1^{st}$ ACM Conf. on Computer & Communication Security, p. 244-250, 1993.

John Kelsey, et al., "Secure Applications of Low-Entropy Keys", Proc. $1^{st}$ International Workshop on Information Security, p. 121-134, 1997.

Bruce Schneier, "Applied Cryptography Protocols, Algorithm, and Source Code in C", $2^{nd}$ Edition, published by John Wiley & Sons, p. 52-53 and p. 429-455, 1996.

Shai Halevi and Hugo Krawczyk, "Public-key Cryptography and Password Protocols", Pro. $5^{th}$ ACM Conf. on Computer & Communication Security, p. 122-131, 1998.

M. Steiner, G. Tsudik, and M. Waidner, "Refinement and Extension of Encrypted Key Exchange", Operating Systems Review, vol. 29, Iss. 3, p. 22-30, 1995.

D.P. Jablon, "Extended Password Key Exchange Protocols Immune to Dictionary Attack", Proceedings Sixth IEEE Enterprise Security Workshop, p. 248-255, 1997.

* cited by examiner

| SYMBOL | DESCRIPTION |
|---|---|
| $f(\ )$ | ALICE'S AND BOB'S COMBINING FUNCTION |
| $I_A, I_B$ | ALICE'S AND BOB'S DISCARDABLE INITIALIZATION VECTOR |
| $K_A, K_B$ | ALICE'S AND BOB'S PRIVATE SESSION KEY |
| $M_A, M_B$ | ALICE'S AND BOB'S PUBLIC KEY |
| $N_A, N_B$ | ALICE'S AND BOB'S RANDOM NONCE FOR KEY VERIFICATION |
| $N_A+1, N_B+1$ | MODIFIED (INCREMENTED) RANDOM NONCES |
| $\alpha, \beta$ | ALICE'S AND BOB'S CONGRUENT EXPONENTIAL BASE; (ALICE'S AND BOB'S MODULO VARIABLE) |
| $P_A, P_B$ | ALICE'S AND BOB'S SECRET PASSWORDS |
| $R_A, R_B$ | ALICE'S AND BOB'S PRIVATE RANDOM NUMBERS |
| $S_A, S_B$ | ALICE'S AND BOB'S HIGH-ENTROPY SECRET |
| $(Y)_X$ | ENCRYPT CLEARTEXT, Y, WITH KEY X |
| $(Z)^{-1}_X$ | DECRYPT CIPHERTEXT, Z WITH KEY X |
| $(N_B)\Sigma_{i=2}^{n}$ | SUPERENCRYPT PLAINTEXT, $N_B$, WITH VARIABLE KEYS n |

FIG. 1

| Alice 202 | XMSN 203 | Bob 204 |
|---|---|---|
| Generate $R_A$  206 | | Generate $R_B$  208 |
| $M_A = \alpha^{R_A} \mod \beta$  210 | | $M_B = \alpha^{R_B} \mod \beta$  212 |
| transmit $M_A$  214 | 214 → | $K_B = (M_A)^{R_B} \mod \beta$  216 |
| $K_A = (M_B)^{R_A} \mod \beta$  220 | ← 218 | transmit $M_B$  218 |
| CONTINUE  222 | | CONTINUE  226 |
| Encrypted Two way transmissions  224 | 230 ↔ | Encrypted Two way transmissions  228 |

FIG. 2 (Prior Art)

| Alice 202 | XMSN 303 | Bob 204 |
|---|---|---|
| Generate $N_A$  302 | | Generate $N_B$  304 |
| encrypt $N_A$ as $(N_A)_{K_A}$  306 | | |
| transmit $(N_A)_{K_A}$  308 | 308 → | $N_A = ((N_A)_{K_A})^{-1}{}_{K_B}$  310 |
| | | increment $N_A$ as $N_A+1$  312 |
| | | encrypt $(N_B, N_A+1)_{K_B}$  314 |
| $N_B$ 320, $N_A+1$ 322 = $((N_B, N_A+1)_{K_B})^{-1}{}_{K_A}$  318 | ← 316 | transmit $(N_B, N_A+1)_{K_B}$  316 |
| increment $N_B$ as $N_B+1$  324 | | |
| encrypt $(N_B+1)_{K_A}$  326 | | |
| transmit $(N_B+1)_{K_A}$  328 | 328 → | $N_B+1 = ((N_B+1)_{K_A})^{-1}{}_{K_B}$  330 |
| verify $N_A+1$  332 | | verify $N_B+1$  340 |
| If true, Bob 204 and Alice 202 share the same session key ($K_A = K_A$) CONTINUE  336 | 334 If false STOP | 342 If false STOP | If true, Alice 202 and Bob 204 share the same session key ($K_A = K_A$) CONTINUE  344 |
| Encrypted Two way transmissions  338 | 348 ↔ | Encrypted Two way transmissions  346 |

FIG. 3 (Prior Art)

| Alice 402 | XMSN 403 | Bob 404 | |
|---|---|---|---|
| Store password $P_A$ 406 and identity 408    410 | | Store password $P_B$ 414 and identity 416    412 | |
| Generate $N_A$    418 | | Generate $N_B$    420 | |
| transmit identity 408, and service request 424    422 | ⇢ 422 | Obtain password $P_B$ 414 and identity 416 from identity 408    424 | |
| | | verify identity 408 = identity 416    426 | |
| | | If true, Alice 403 is IDENTIFIED to Bob 404, CONTINUE    430 | If false STOP    428 |
| encrypt $N_B$ as $(N_B)_{P_A}$    440 | ⇠ 438 | transmit $N_B$    438 | |
| transmit $N_A$ 418, $(N_B)_{P_A}$ 440    442 | 442 ⇢ | verify $N_B = ((N_B)_{P_A})^{-1}{}_{P_B}$    444 | |
| | | If true, Alice 402 is AUTHENTICATED to Bob 404, CONTINUE    448 | If false STOP    446 |
| | | encrypt $N_A$ as $(N_A)_{P_B}$    450 | |
| verify $N_A = ((N_A)_{P_B})^{-1}{}_{P_A}$    454 | ⇠ 452 | transmit $(N_A)_{P_B}$    452 | |
| If true, Bob 404 is AUTHENTICATED to Alice 402, CONTINUE    458 | If false STOP    456 | CONTINUE    462 | |
| Unencrypted Two way transmissions    460 | ⇠ 466 ⇢ | Unencrypted Two way transmissions    464 | |

FIG. 4

| Alice 502 | XMSN 503 | Bob 504 | | |
|---|---|---|---|---|
| Store password $P_A$ 506 and identity 508    510 | | Store password $P_B$ 514 and identity 516    512 | | |
| Generate $R_A$    518 | | Generate $R_B$ 522 and $N_B$ 524    520 | | |
| $M_A = (\alpha)^{R_A} \mod \beta$    526 | | $M_B = (\alpha)^{R_B} \mod \beta$    528 | | |
| transmit identity 508, $M_A$ 526, and service request 532    530 | 530 ---→ | Obtain password $P_B$ 514 and identity 516 based on identity 508    534 | | |
| | | verify identity 508 = identity 516    536 | | |
| | | If true, 544 Alice 502 is IDENTIFIED to Bob 504; CONTINUE | If false 538 | |
| | | | 542 generate random $P_B$ 542; CONTINUE | 540 STOP |
| | | $K = K_B = (M_A)^{R_B} \mod \beta$    546 | | |
| | | $S = S_B = f(P_B, M_A, M_B)$    548 | | |
| | | encrypt $N_B$ as $(N_B)_S$    550 | | |
| | | encrypt $(N_B)_S$ as $((N_B)_S)_K$    552 | | |
| $K = K_A = (M_B)^{R_A} \mod \beta$    556 | ←--- 554 | transmit $M_B, ((N_B)_S)_K$    554 | | |
| $S = S_A = f(P_A, M_A, M_B)$    558 | | | | |
| $N_B = ((((N_B)_S)_K)^{-1}_K)^{-1}_S$    560 | | | | |
| Generate $N_A$    562 | | | | |
| modify $N_B$ as $N_{B_A} + 1$    564 | | | | |
| encrypt $N_A, N_B+1$ as $(N_A, N_B+1)_S$    566 | | | | |
| encrypt $(N_A, N_B+1)_S$ as $((N_A, N_B+1)_S)_K$    568 | | | | |
| transmit $((N_A, N_B+1)_S)_K$    570 | 570 ---→ | $N_A$ 574, $N_B+1$ 576 = $((((N_A, N_B+1)_S)_K)^{-1}_K)^{-1}_S$    572 | | |
| | | verify $N_B+1$ 576 $-$ 1 = $N_B$ 524    578 | | |
| | | If true, Alice 502 is AUTHENTICATED to Bob 504; CONTINUE    580 | If false STOP 579 | |
| One way transmissions 582 | 582 → | Open one way link 581 | generate $I_B$ 583 | |

FIG. 5A

| Alice 502 | XMSN 503 | Bob | 504 |
|---|---|---|---|
| | | If true, 580 Alice 502 is AUTHENTICATED to Bob 504; CONTINUE | If false 579 STOP |
| One way transmissions 582 | 582 → | Open one way link 581 | generate $I_B$ 583 |
| | | modify $N_A$ as $N_A+1$ | 584 |
| | | encrypt $I_B$, $N_A+1$ as $(I_B, N_A+1)_S$ | 586 |
| | | encrypt $(I_B, N_A+1)_S$ as $((I_B, N_A+1)_S)_K$ | 588 |
| $I_B$ 591, $N_A+1$ 592 = $(((I_B, N_A+1)_S)_K)^{-1}_K)^{-1}_S$ 590 | ← 589 | transmit $((I_B, N_A+1)_S)_K$ | 589 |
| verify $N_A+1$ 592 − 1 = $N_A$ 562  593 | | CONTINUE | 597 |
| If true, Bob 504 is IDENTIFIED and AUTHENTICATED to Alice 502, CONTINUE 595 | 594 If false STOP | | |
| Encrypted 596 Two way transmissions | ← 599 → | Encrypted 598 Two way transmissions | |

FIG. 5B

| Alice 602 | XMSN 603 | Bob 604 |
|---|---|---|
| Store password $P_A$ 606 and identity 608    610 | | Store password $P_B$ 614 and identity 616    612 |
| Generate $R_A$ 620 and $N_A$ 622 ⟵ 618 | | Generate $R_B$ 626 and $N_B$ 628   624 |
| $M_A = (\alpha)^{R_A} \bmod \beta$    630 | | $M_B = (\alpha)^{R_B} \bmod \beta$    632 |
| encrypt $N_A$ as $(N_A)_P$    634 | | |
| transmit identity 608, $M_A$ 630, $(N_A)_{P_A}$ 634, and service request 638    636 | ⟶ 636 | Obtain password $P_B$ 614 and identity 616 based on identity 608    640 |
| | 642 ⟶ | verify identity 608 = identity 616 |
| | | If true, 650 Alice 602 is IDENTIFIED to Bob 604; CONTINUE    If false 644 648 generate random $P_B$ 648; CONTINUE    646 STOP |
| | | $N_A = ((N_A)_{P_A})^{-1}{}_{P_B}$    652 |
| | | $K = K_B = (M_A)^{R_B} \bmod \beta_B$    654 |
| | | $S = S_B = f(P_B, M_A, M_B)$    656 |
| | | modify $N_A$ as $N_A + 1$    658 |
| | 660 ⟶ | encrypt $(N_B, N_A+1)$ as $(N_B, N_A+1)_S$ |
| | 662 ⟶ | encrypt $(N_B, N_A+1)_S$ as $((N_B, N_A+1)_S)_K$ |
| $K = K_A = (M_B)^{R_A} \bmod \beta$    665 | ⟵ 664 | transmit $M_B, ((N_B, N_A+1)_S)_K$    664 |
| $S = S_A = f(P_A, M_A, M_B)$    668 | | |
| $N_B$ 672, $N_A+1$ 674 = $((((N_B, N_A+1)_S)_K)^{-1}{}_K)^{-1}{}_S$    670 | | |
| verify $N_A+1$ 674 $- 1 = N_A$ 622 ⟶ 676 | | |
| If true, Bob 604 is IDENTIFIED and AUTHENTICATED to ALICE 502; CONTINUE    678 | 677 If false STOP | |
| Open one way link 679 | ⟵ 680 | One way transmissions 680 |
| generate $I_A$    681 | | |

FIG. 6A

| Alice 602 | | XMSN 603 | Bob 604 | |
|---|---|---|---|---|
| If true, Bob 604 is IDENTIFIED and AUTHENTICATED to ALICE 502; CONTINUE 678 | If false STOP 677 | | | |
| Open one way link 679 | | ←--680-- | Open one transmissions 680 | |
| generate $I_A$ 681 | | | | |
| modify $N_B$ as $N_B+1$ 682 | | | | |
| encrypt $I_A$, $N_B+1$ as $(I_A, N_B+1)_S$ 683 | | | | |
| encrypt $(I_A, N_B+1)_S$ as $((I_A, N_B+1)_S)_K$ 684 | | | | |
| transmit $((I_A, N_B+1)_S)_K$ 685 | | --685--→ | $I_{A\,B}$ 687, $N_B+1$ 688 = $(((I_A, N_B+1)_S)_K)-1_K)-1_S$ 686 | |
| CONTINUE 696 | | | verify $N_B+1$ 688 − 1 = $N_B$ 628 690 | |
| | | | If true, Alice 602 is AUTHENTICATED to Bob 604, CONTINUE 693 | If false STOP 692 |
| Encrypted Two way transmissions 698 | | ←699→ | Encrypted Two way transmissions 694 | |

FIG. 6B

MUTUALLY AUTHENTICATED SECURE KEY EXCHANGE (MASKE)

BACKGROUND OF THE INVENTION

1. Field of the Invention

The invention includes cryptography. More particularly, an embodiment of the invention includes electric signal transmission and modification by particular algorithmic function encoding for secure key exchange to effectuate mutual identification and authentication.

2. Background Information

Cryptography may be viewed as the process or skill of communicating in or deciphering secret writings or ciphers. To prevent anyone but the intended recipient from reading communicated data, plain text (cleartext) may be converted into ciphered text (ciphertext) through a cryptography procedure referred to as encryption. Forming the basis of network security, a common type of data encryption includes public-key encryption.

Public-key encryption (PKE or "public-key cryptography") may be an encryption scheme where each participant receives a pair of keys, called the public key and the private key. Each public key may be published while each private key may be kept secret. Using the public key of a message's intended recipient, the message to that intended recipient may be encrypted so that it may only be decrypted by the intended recipient using that participant's private key. Public-key encryption may be used for authentication, confidentiality, integrity, and non-repudiation.

As with most cryptography discussions, the descriptions in this patent make use of two actors, namely Alice and Bob, who are trying to conduct secure communications before the watchful eyes of passive eavesdropper, Eve, and without the interference of malicious active attacker (or man-in-the-middle), Mallory. Most public key exchange algorithms involve Alice (client) sending Bob (server) a data packet and Bob sending Alice a data packet, where each may combine the parts included in the data packets to generate a single-use, shared session key, and then prove to each other that the shared key is valid.

The first public-key encryption scheme was patented by Martin Hellman, Bailey Diffie, and Ralph Merkle in 1980 as U.S. Pat. No. 4,200,770. Through the Hellman-Diffie-Merkle key exchange (conventionally the Diffie-Hellman key exchange), the need for the sender and the receiver to share secret information (private keys) via some secure channel may be eliminated since all exchanged communications involve only public keys, and no private key need be transmitted or shared.

Although the Diffie-Hellman key exchange may establish a communication channel secure from eavesdropping, the Diffie-Hellman key exchange is subject to man-in-the-middle attacks. That is, an interloper such as Mallory may dispose himself between Bob and Alice and pretend to be Alice to Bob and pretend to be Bob to Alice. This may occur since the Diffie-Hellman key exchange fails to identify or authenticate to Bob that Alice may be really Alice, or vice versa. Since Mallory may dispose himself between Bob and Alice, Mallory may decrypt, examine, and reencrypt passing data packets without the knowledge of Bob or Alice.

As an alternative to positioning himself as an interloper, Mallory may eliminate Bob from the picture and emulate or "spoof" his identity. After Mallory establishes a secure channel with Alice, the spoofing Mallory may continue the communication with Alice until he receives a privileged piece of information, such as a password, or has delivered a virus or Trojan horse to Alice's system.

To overcome the limitations of the Diffie-Hellman key exchange, U.S. Pat. No. 5,241,599, known as Encrypted Key Exchange (EKE), modifies Diffie-Hellman by encrypting at least one of Bob and Alice's public keys with a secret password that may be known to both Alice and Bob prior to transmission over a network. However, for EKE to work, the shared secret password must be stored as cleartext within the server Bob. An augmentation of U.S. Pat. No. 5,241,599 (Augmented EKE protocol or A-EKE) employs a one-way hash of the user's password as the encryption key in the Diffie-Hellman variant of EKE. The user then sends an extra message based on the original password. This message may authenticate the newly chosen session key.

Simple Password Exponential Key Exchange (SPEKE), developed by Integrity Sciences of Westboro, Mass., modifies Encrypted Key Exchange (EKE) to guard against dictionary attacks by storing shared secret passwords as a specially computed derivative that may not be equivalent or reversible to the original plaintext of the shared secret passwords. An attacker may not be able to use a captured password database directly to compromise the targeted host. A less secure implementation of SPEKE allows the host to store the passwords as cleartext. Secure Remote Password (SRP) protocol, developed by Stanford University of Stanford, Calif., is another password authentication and key-exchange protocol along the same lines as SPEKE.

BRIEF DESCRIPTION OF THE DRAWINGS

FIG. 1 illustrates a list of symbols used in the below discussion and their corresponding description;

FIG. 2 illustrates one session of Diffie-Hellman key exchange 200;

FIG. 3 illustrates one session of Diffie-Hellman key verification 300 of Diffie-Hellman key exchange 200 of FIG. 2;

FIG. 4 illustrates two-way random number exchange 400;

FIGS. 5A and 5B illustrate session 500 of the invention;

FIGS. 6A and 6B illustrate session 600 of the invention;

DETAILED DESCRIPTION OF THE INVENTION

Figure 7:
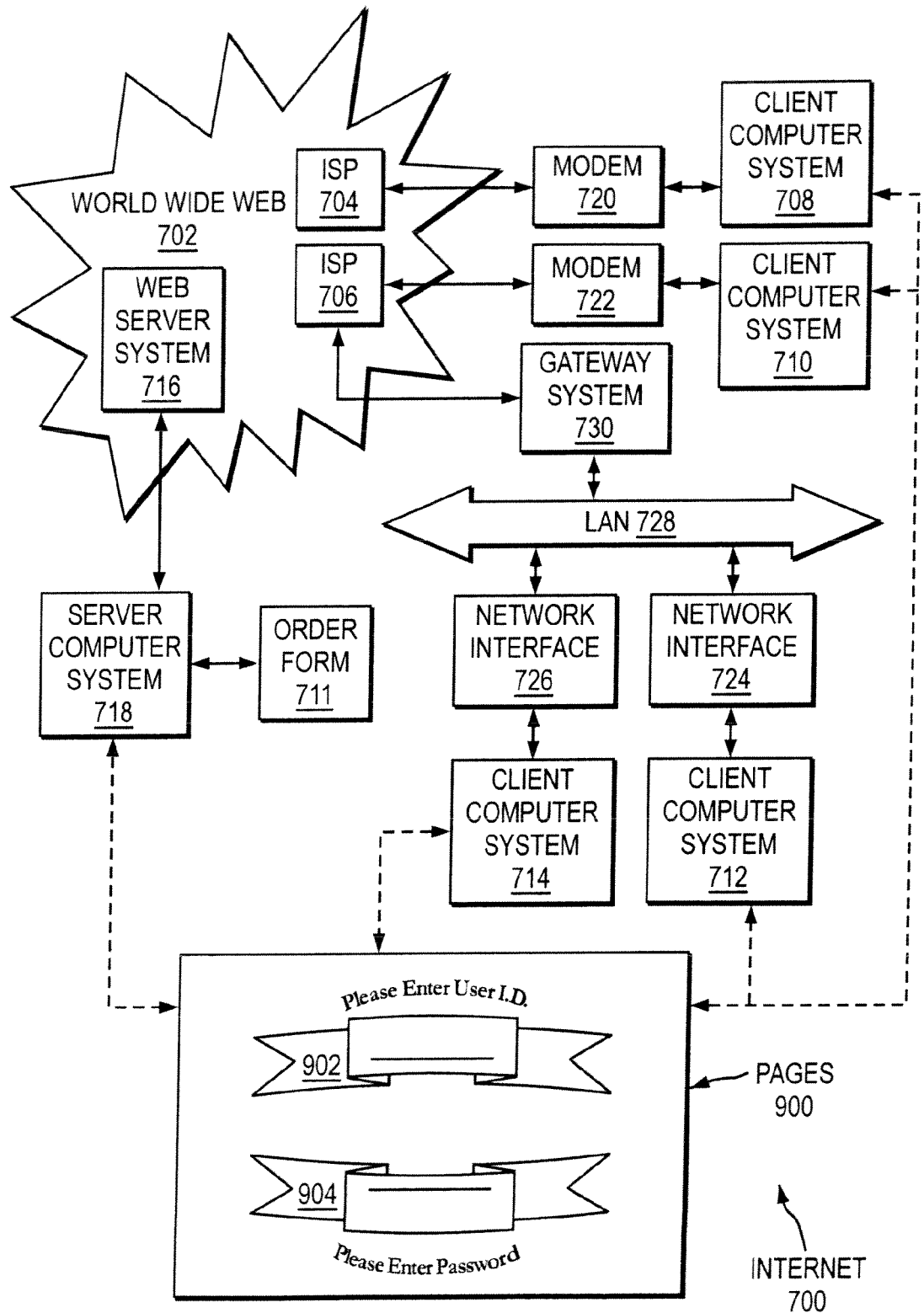
FIG. 7 illustrates an embodiment of the invention employed in Internet 700.

As with most cryptography discussions, the below description makes use of two actors, namely Alice and Bob. Alice and Bob are trying to conduct secure communications before the watchful eyes of passive eavesdropper, Eve, and without the interference of malicious active attacker (or man-in-the-middle), Mallory.

FIG. 1 illustrates a list of symbols used in the below discussion and their corresponding description. Some assumptions regarding the use of these symbols are employed in this patent. For example, it is assumed that Bob and Alice use the same combining function $f(\ )$. When either Bob or Alice decrypt a transmission, it is assumed that the transmission was unaffected by noise or the like and that the decryption itself worked as intended. It is assumed that Alice and Bob employ the same modulo variables $\alpha$ and $\beta$. Moreover, it is assumed that Alice and Bob actually share each other's secret password.

Since embodiments of the invention may employ aspects of the Diffie-Hellman key exchange and 2-Way Random Number Exchange, these protocols will be discussed in connection with FIG. 2, FIG. 3, and FIG. 4.

FIG. 2 illustrates one session of conventional Diffie-Hellman key exchange 200. In exchange 200, Alice 202 may generate random number $R_A$ 206 and Bob 204 may generate random number $R_B$ 208. Next, at steps 210 and 212, respectively, Alice 202 and Bob 204 may use modulus exponentiation on their respective private keys $R_A$ 206 and $R_B$ 208 to derive keys that will be publicly exchanged.

Modular (mod) reduction focuses on the remainder or residue of the division of two integers. The operation b=α mod β denotes the residue b of congruent α, such that the residue b may be an integer from 0 to β–1, where β may be the modulo. For example, thirteen divided by three equals four, with a remainder of one. Thus, thirteen modulo three (13 mod 3) is equal to one (1=13 mod 3). Similarly, sixteen modulo three is equal to one (1=16 mod 3), there being five remainder one after sixteen is divided by three. Likewise, nineteen modulo three also is equal to one (1=19 mod 3).

Based on modular reduction, transmitting a residue of "1" across an unsecured network will not directly reveal the congruent α (in the above example, 13, 16, or 19). Employing very large numbers for the congruent α and the modulo β (for example, greater than 200 bit numbers) works towards making it difficult for Mallory or Eve to detect the congruent α. Raising the congruent α to a random exponent (such as $R_A$ or $R_B$) makes it very difficult for Mallory or Eve to detect the congruent α. However, the recipient such as Alice or Bob will have that which may be needed to determine the congruent α.

To generate public key $M_A$ 210, Alice 202 may set her public key $M_A$ 210 equivalent to constant parameter α raised to the exponential power of Alice's private, random key $R_A$ 206, modulo parameter β. Alice 202 and Bob 204 are assumed to know the values of parameter α and parameter β. Similarly, to generate public key $M_B$ 212, Bob 204 may set his public key $M_b$ 212 equivalent to constant parameter α a raised to the exponential power of Bob's private, random key $R_B$ 208, modulo parameter β. Thus, $$M_A = \alpha^{R_A} \bmod \beta \quad (210)$$

$$M_B = \alpha^{R_B} \bmod \beta \quad (212)$$

Alice 202 and Bob 204 may next exchange their generated public keys. Alice 202 may transmit her public key $M_A$ 210 at step 214 to Bob 204 so that Bob 204 may generate Bob's version of the session key, here $K_B$ 216. On receiving Alice's public key $M_A$ 210, Bob 204 may employ modulus exponentiation at step 216 to generate Bob 204's version of the session key as follows:

$$K_B = (M_A)^{R_B} \bmod \beta \quad (216).$$

Bob 204 may transmit his public key $M_B$ 212 at step 218 to Alice 202 so that Alice 202 may generate her own version of the session key, here $K_A$ 220, for her own use. On receiving Bob's public key $M_B$ 212, Alice 202 may employ at step 220 a modulus exponentiation similar to the one used by Bob 204 to generate her version of the session key as follows:

$$K_A = (M_B)^{R_A} \bmod \beta \quad (220).$$

At step 222, Alice 202 may continue with session keys $K_A$ to allow two way transmission 224 and Bob 204 may continue at step 226 with session keys $K_B$ to allow two way transmission 228. two way transmission 228 may be a two way encrypted transmission. Where each of two way transmission 224 and two way transmission 228, two way transmission 230 may be continuously opened between Alice 202 and Bob 204.

Two way transmission 224 and two way transmission 228 may be allowed where session keys $K_A$ 220 and $K_B$ 216 are identical. Session keys $K_A$ 220 and $K_B$ 216 may be identical because Alice 202 combined $R_A$ and $M_B$ and Bob 204 combined $M_A$ and $R_B$, each in a particular mathematical way, where the public half of the keys $M_A$ and $M_B$ were based on common parameters, namely parameter α and parameter β. Session keys $K_A$ 220 and $K_B$ 216 may be private to Alice 202 and Bob 204 in connection with particular session 200 since only Alice 202 and Bob 204 know of the particular mathematical formula and the parameters used in that formula.

Although session keys $K_A$ 220 and $K_B$ 216 may be identical, this may not always be the case. If there is a mistake in transmission 214 or 218 over transmission lines 203 or if Mallory substitutes one of his data packets for a transmitted data packet, $K_A$ 220 and $K_B$ 216 may not match such that $K_B \cdot K_A$. If $K_B \cdot K_A$, Alice 202 and Bob 204 do not share a common secret session key. To ensure that Bob's version of the session key and Alice's version of the session key match, a key verification phase may be performed.

FIG. 3 illustrates one session of conventional Diffie-Hellman key verification 300 of Diffie-Hellman key exchange 200 of FIG. 2. In verification 300, Alice 202 may generate random number $N_A$ 302 and Bob 204 may generate random number $N_B$ 304. Random number $N_A$ 302 and random number $N_B$ 304 may serve as verification nonces for session 300. A nonce may be a random number made and used briefly for a special purpose, such as validating one particular instance of session 300. At step 306, Alice 202 may encrypt random number $N_A$ 302 with Alice's version of session key $K_A$ 220 to obtain ciphertext.

Encryption of a number may be represented in this patent by parentheses disposed about the number, where the parentheses include a subscript letter of encryption, in step 306 the letter $K_A$. The subscript "A" to the letter K may indicate that the encrypting key $K_A$ 220 is Alice's ("A") version of the session key ("K"). At step 308, Alice 202 may transmit encrypted random number $(N_A)_{K_A}$ 306 to Bob 204.

Once Bob 204 receives the packet of random number $N_A$ 302 encrypted to Alice's key $K_A$ 220 (namely, $N_A$ encrypted to $K_A$), Bob 204 may decrypt encrypted random number $(N_A)_{K_A}$ 306 with Bob's version of the session key $K_B$ 216 at step 310 to extract random number $N_A$ 310. Under most circumstances, $N_A$ 310 will equal $N_A$ 302.

Decryption by a key may be represented in this patent by parentheses disposed about the encrypted quantity, where the parentheses may include the decryption superscript of negative one and the decryption key subscript letter, in step 310 the letter $K_B$. For Diffie-Hellman key verification 300 to work, Bob 204 must apply the same symmetrical encryption algorithm for his step 310 decryption as that applied by Alice 202 in encryption step 306. Thus, Diffie-Hellman key verification 300 assumes that Bob 204 and Alice 202 share the same symmetrical encryption algorithm.

Next, at step 312, Bob 204 increments Alice's random number $N_A$ 310 by one. At step 314, Bob 204 may encrypt as a string both Bob's random number $N_B$ 304 and Bob's increment 312 of Alice's random number $N_A$ 310 with Bob's version of the session key $K_B$ 216. This may be written as $$(N_B, N_A+1)_{K_B} \quad (314).$$

At step 316, Bob 204 may transmit encrypted string $(N_B, N_A+1)_{K_B}$ 314 to Alice 202.

At step 318, Alice 202 may decrypt encrypted string $(N_B, N_A+1)_{K_B}$ 314 to obtain Bob's random number $N_B$ 320 and to obtain Bob's increment of Alice's random number $N_A$ 322.

Alice 202 then may increment Bob's random number $N_B$ 320 at step 324 to obtain $N_B+1$ 324, encrypt the increment of Bob's random number $N_B$ 324 at step 326, and transmit encrypted packet 326 at step 328 to Bob 204. At step 330, Bob 204 may decrypt packet 326 received from Alice 202 to obtain Alice's increment of Bob's random number $N_B$ 330.

Since both parties possess their original random number and the increments generated and transmitted by the other party, each originator may verify that the result they received from the other party is the correct increment of their original randomly generated nonce.

At step 332, Alice 202 may verify that Bob 204 did in fact correctly increment Alice's random number $N_A$ 302 by determining at step 332 whether incremented random number $N_A+1$ 322 received from Bob 204 over transmission 316 less its increment is equal to Alice's random number $N_A$ 302.

If incremented random number $N_A+1$ 322 less its increment is not equal to Alice's random number $N_A$ 302, Alice 202 may terminate session 300 at step 334. If incremented random number $N_A+1$ 322 less its increment is equal to Alice's random number $N_A$ 302, then Alice 202 has verified that Bob's version of the session key, $K_B$, is equal to Alice's version of the session key, $K_A$ (namely, $K_B=K_A$). Alice 202 then may continue with session 300 at step 336 to allow two way transmission 338.

At step 340, Bob 204 may verify that Alice 202 did in fact correctly increment Bob's random number $N_B$ 304 by determining at step 340 whether incremented random number $N_B+1$ 330 received from Alice 202 over transmission 328 less its increment is equal to Bob's random number $N_B$ 304.

If incremented random number $N_B+1$ 330 less its increment is not equal to Bob's random number $N_B$ 324, Bob 204 may terminate session 300 at step 342. If incremented random number $N_B+1$ 330 less its increment is equal to Bob's random number $N_B$ 304, then Bob 202 has verified that Alice's version of the session key, $K_A$, is equal to Bob's version of the session key, $K_B$ (namely, $K_A=K_B$) Bob 204 then may continue with session 300 at step 344 to allow two way transmission 346.

At the point where both two way transmission 338 and two way transmission 346 are allowed, two way transmission 348 may be continuously opened between Alice 202 and Bob 204. Each of two way transmission 338, two way transmission 346, and two way transmission 348 may be two way encrypted transmissions.

FIG. 4 illustrates two-way random number exchange 400. Two-way random number exchange 400 assumes that password $P_A$ 406 equals password $P_B$ 414. Each party to two-way random number exchange 400 then works to satisfy themselves that the other person knows the password in their own possession. In other words, the protocol of two-way random number exchange 400 in FIG. 4 works towards proving to Bob 404 that Alice 402 knows password $P_B$ 414 (which is in the possession of Bob 404), and likewise works towards proving to Alice 402 that Bob 404 knows password $P_A$ 406 (which is in the possession of Alice 402).

To begin, Alice 402 may store password $P_A$ 406 as associated with identity 408 at step 410. Identity 408 may represent Alice 402, herself ("userid=Alice"). At step 412, server Bob 404 may store password $P_B$ 414 as associated with identity 416 in a secure location. This storage may occur long before the remainder of session 400. Identity 416 may represent Alice 402, herself ("userid=Alice"). Where password $P_A$ 406 as associated with identity 408 in fact equals password $P_B$ 414 as associated with identity 416, password $P_A$ 406 and password $P_B$ 414 may be referred to as a shared password. Where this shared password is only known to Alice 402 and Bob 404, the shared password may be referred to as a shared secret password.

In two-way random number exchange 400, Alice 402 may generate random number $N_A$ 418 at step 418 and Bob 404 may generate random number $N_B$ 420 at step 420. At step 422, Alice 402 may transmit identity 408 and service request 424 to Bob 404. Passwords employed in the protocol of two-way random number exchange 400 are never sent over the network 403 in the clear.

At step 424, Bob 404 may retrieve password $P_B$ 414 and identity 416 based on received identity 408. At step 426, Bob 404 may verify that identity 408 received from Alice 402 in transmission 422 equals identity 416. By itself, successful retrieval of identity 416 may validate the prior presence of Alice 402 on server Bob 404. If identity 408 does not equal identity 416, Bob 404 may proceed to step 428 and stop transmission 403. If identity 408 does equal identity 416, Bob 404 may proceed to step 430. At step 430, Bob 404 may continue to step 438 since Alice 402 is identified to Bob 404. At step 438, Bob 404 may transmit random number $N_B$ 420 to Alice 402.

At step 440, Alice 402 may encrypt Bob's random number $N_B$ 420 with password $P_A$ 406. At step 442, Alice may transmit both Alice's random number $N_A$ 418 and the password encrypted nonce $(N_B)_{P_A}$ 440 to Bob 404.

Bob 404 may decrypt the ciphertext $(N_B)_{P_A}$ 440 at step 444 by employing password $P_B$ 414 as a key. This may permit Bob 404 to verify that his generated random number $N_B$ 420 is equal to the decryption of Alice's password encrypted nonce $(N_B)_{P_A}$ 440 received over transmission 442, such that $$N_B=((N_B)_{P_A})^{-1}{}_{P_B} \qquad (444).$$

If false, Bob 404 may proceed to step 446 and stop transmission 403. If true, Bob 404 may continue with session 400 at step 448 since Alice 402 is authenticated to Bob 404 by proving that password $P_A$ 406 is equal to password $P_B$ 414. Once authenticated, Bob 404 may encrypt Alice's random number $N_A$ 418 with the password $P_B$ 414 at step 450. Bob 404 may then transmit encrypted package 450 to Alice 402 at step 452. Alice 402 may decrypt encrypted package 450 to verify at step 454 that her generated random number $N_A$ 418 is equal to the decryption of Bob's password encrypted nonce $(N_A)_{P_B}$ 450 such that $$N_A=((N_A)_{P_B})^{-1}{}_{P_A} \qquad (454).$$

If false, Alice 402 may proceed to step 456 and stop transmission 403. If true Alice 402 may proceed to step 458 and continue with session 400 since Bob 404 is now authenticated to Alice 402. To continue with session 400, Alice 402 may seek to continue with an unecrypted, two way transmissions at step 460 so as to receive from Bob 404 action on service request 424.

After Bob 404 transmits encrypted package 450 to Alice 402 at step 452, Bob may continue with session 400 at step 462. Bob may continue with session 400 by seeking to establish two way communications with Alice 402 at step 464. If Alice 402 seeks to establish two way communications at step 460 and Bob 404 seeks to establish two way communications at step 464, Alice 402 and Bob 404 may establish unencrypted, two way communication channel 466.

Although the protocol of the Diffie-Hellman key exchange 200 of FIG. 2 and verification 300 FIG. 3 may establish a communication channel that may be secure from eavesdropping even where the constant parameters α and β are known, this protocol is subject to man-in-the-middle attacks. That is, an interloper such as Mallory may dispose himself between Bob 204 and Alice 202 at transmission 203 of FIG. 2 or transmission 303 of FIG. 3 and pretend to be Alice to Bob and pretend to be Bob to Alice. The reason for this is that the Diffie-Hellman protocol 200 and 300 does not authenticate to Bob 204 that Alice 202 may be really Alice 202, or vice versa. Since Mallory may dispose himself between Bob 204 and Alice 202, Mallory may decrypt, examine, and reencrypt passing data packets without the knowledge of Bob 204 or Alice 202.

A strength of two-way random number exchange 400 of FIG. 4 lies in its resistance to spoofing, man-in-the-middle, and replay attacks. Since any password employed in the protocol of two-way random number exchange 400 is never sent over the network in the clear, these password cannot be picked up directly by Mallory or Eve. Thus, Mallory cannot replay an authentication session such as session 400 since the other party's nonce is random and Mallory cannot properly encrypt it with a password of exchange 400. Spoofing and man-in-the-middle attacks may be discovered for the same reason. Thus, one way to tackle the problem of proving identity is two-way random number exchange such as seen in FIG. 4. A discussion on two-way random number exchange may be found in Gursharan S. Sidhu, et al., *Inside AppleTalk®* at 13-29 to 13-30 (1989).

Note that the two way communication channel 230 of FIG. 2 and 348 of FIG. 3 are encrypted channels whereas the two way communication channel 466 of FIG. 4 is unencrypted. Thus, it would not be obvious for one having ordinary skill in the art to combine the teachings of FIG. 2 and FIG. 3 with that of FIG. 4. However, employing aspects of the Diffie-Hellman key exchange of FIG. 2 and FIG. 3 along with the 2-Way Random Number Exchange of FIG. 4 leads to surprising results as evidenced by the subsequent discussion.

FIGS. 5A and 5B illustrate session 500 of the invention. Session 500 may include secure key exchange for identification and authentication where Alice 502 may be the final verifier. Secure key exchange may be viewed as verifying a session key after an initial public key exchange. Moreover, identification may be viewed as establishing identity and authentication may be viewed as verifying identity.

In session 500, Alice 502 may store password $P_A$ 506 as associated with identity 508 at step 510. Identity 508 may be any transmittable device by which Alice 502 may be recognizable or known to Bob 504. Identity 508 may represent Alice 502 herself ("userid=Alice"). Storage by client Alice 502 may be through memorizing password $P_A$ 506 and identity 508 within user Alice's own mind.

At step 512, server Bob 504 may store password $P_B$ 514 as associated with identity 516 in a secure location. Identity 516 may represent Alice 502, herself ("userid=Alice").

Where password $P_A$ 506 as associated with identity 508 equals password $P_B$ 514 as associated with identity 516, password $P_A$ 506 and password $P_B$ 514 may be referred to as a shared password. Where this shared password is only known to Alice 502 and Bob 504, the shared password may be referred to as a shared secret password. The secret password may be shared through communication channels other than transmission channel 503. Where transmission channel 503 may be the Internet, the communication channel other than transmission channel 503 may be the domestic or international government mail.

Alice 502 may generate random number $R_A$ 518 at step 518. At step 520, Bob 504 may generate random number $R_B$ 522 and random number $N_B$ 524. Alice's random number $R_A$ 518 and Bob's random number $R_B$ 522 may be large, 512-bit random numbers and may serve as "private keys" for session 500. Bob's random number $N_B$ 524 may serve as a nonce for session 500. A nonce may be a random number made and used briefly for a special purpose, such as validating one particular step of session 500.

Next, at steps 526 and 528, respectively, Alice 502 and Bob 504 may use modulus exponentiation on their respective private keys $R_A$ 518 and $R_B$ 522 to derive keys that will be publicly exchanged. Modulus (mod) exponentiation may be used to generate these public keys since exponentiation in modular arithmetic may be performed by a computer without generating huge intermediate results.

To generate public key $M_A$ 526, Alice 502 may set her public key $M_A$ 526 equivalent to constant parameter α raised to the exponential power of Alice's private, random key $R_A$ 518, modulo parameter β. Parameter α and parameter β may be known to both Alice 502 and Bob 504 and may be prime numbers. A prime number may be viewed as an integer greater than the number one whose only factors are one and itself such that no other number evenly divides that integer. The length of parameter α and parameter β may be at least 512-bits.

To generate public key $M_B$ 528, Bob 504 may set his public key $M_B$ 528 equivalent to constant parameter α raised to the exponential power of Bob's private, random key $R_B$ 522, modulo parameter β. Thus, $$M_A = (\alpha)^{R_A} \bmod \beta \tag{526}$$

$$M_B = (\alpha)^{R_B} \bmod \beta \tag{528}.$$

Alice 502 and Bob 506 may next exchange their generated public keys. However, since it may be client Alice 502 who is seeking authentication from server Bob 504 as a prelude to requesting communication services such as service request 532, Alice 502 first may transmit identity 508, public key $M_A$ 526, and service request 532 at step 530 to Bob 504.

At step 534, Bob 504 may obtain password $P_B$ 514 and identity 516 in his user list based on identity 508 received from Alice 502 over transmission 530. Password $P_B$ 514 may be of poor quality such as the low entropy English word "shine." Bob 504 may have cleartext access to password $P_B$ 514. Alternatively, Bob 504 may store password $P_B$ 514 as ciphertext, retrieve as ciphertext, and then decrypt the encrypted password to cleartext $P_B$ 514 so as to minimize the amount of time password $P_B$ 514 resides as cleartext in Bob 504. Bob 504 may also decrypt password $P_B$ 514 to cleartext and to several other nonce numbers so that the cleartext of password $P_B$ 514 resides among a list of cleartext nonce numbers of which only Bob 504 may know which is password $P_B$ 514.

At step 536, Bob 504 may verify that identity 508 received from Alice 502 equals identity 516 as obtained from Bob's user list. If identity 508 does not equal identity 516 at step 536, Alice 502 may be an invalid user as far as Bob 504 may be concerned and Bob 504 may proceed to step 538.

From step 538, Bob 504 may have two options. If Bob 504 proceeds to step 540, Bob 504 may stop participating in session 500. In other words, in response to an invalid user attempting access to Bob 504, server Bob 504 may terminate session 500. Preferably, server Bob 504 would continue session 500 by generating a random password $P_B$ 542 at step 542. By continuing session 500 with randomly generated password $P_B$ 542, Bob 504 may avoid revealing the validity of account names stored in the user list of Bob 504. By not revealing the validity of account names stored in the user list of Bob 504, Bob 504 may not be subject to repeat attacks.

If identity 508 does equal identity 516 at step 536, Bob 504 may continue at step 544 with session 500. On continuing with session 500, Bob 506 may employ modulus exponentiation on Alice's public key $M_A$ 526 at step 546 to generate private session key $K_B$ 546 as follows:

$$K_B = (M_A)^{R_B} \bmod \beta \quad (546).$$

It is assumed that $K = K_B$, thus $$K = K_B = (M_A)^{R_B} \bmod \beta \quad (546).$$

Session key $K_B$ 546 may be a key whose use may be limited to a particular session, such as session 500. The order of step 546 may be changed with step 536, step 534 or step 548 described below.

At step 548, Bob 504 may employ a combining function, $f$, on password $P_B$ 514 (or password $P_B$ 542) and on the key exchange pieces of Alice's public key $M_A$ 526 and Bob's public key $M_B$ 528 to generate high-entropy secret $S_B$ 548. Similar to the assumption that $K = K_B$, it is assumed that $S = S_B$.

Advantageously, the combining function need not encrypt the key exchange pieces ($M_A$ 526 and $M_B$ 528) with password $P_B$ 514 according to a standard encryption scheme, such as Data Encryption Standard (DES) or Rivest Cipher 4 (RC4). In one embodiment, Bob's combining function, $f$, combines the key exchange pieces with password $P_B$ 514 and hashes the result using a one-way hashing algorithm. The use of the three variables—password $P_B$ 514, public key $M_A$ 526, and public key $M_B$ 528—may make the output high-entropy secret $S_B$ 548 session specific, that is, specific to one session such as session 500.

The combining function may be any function where the input data cannot be determined given the output data. In view of this input/output relationship, the combining function may be a secure hash. More particularly, the combining function may be a one-way hash function. The one-way hashing algorithm may be the Secure Hash Algorithm (SHA) or the Message Digest 5 (MD5). A Secure Hash Algorithm (SHA) may be called secure because it may be designed to be computationally infeasible to recover a message corresponding to a given message digest, or to find two different messages that produce the same message digest. The one-way hashing algorithm also may be Snefru (named after an Egyptian pharaoh), Nippon Telephone and Telegraph Hash (N-Hash), or Gosudarstvennyl Standard (GOST) Soyuza SSR (Government Standard of the Union of Soviet Socialist Republics—GOST USSR).

Combining and hashing may result in scattering the data bits representing password $P_B$ 514 among the data bits representing the key exchange pieces, here, the two random numbers of $M_A$ 526 and $M_B$ 528. A benefit of employing a one-way hashing algorithm on one or more parts to produce a resulting value may be that the resulting value cannot be reverse engineered to obtain the original parts. Thus, interception of any form of high-entropy secret $S_B$ 548 by Mallory or Eve over transmission 503 may not diminish the security of session 500.

In another embodiment, the combining function, $f$, may combine that value or those values known by both Bob 504 and Alice 502 and hash the result. In a further embodiment, the combining function, $f$, may hash password $P_B$ 542 into itself (for example, $S_B = f(P_B, P_B)$). Moreover, in another embodiment, the combining function may combine at least one of Alice's public key $M_A$ 526 and Bob's public key $M_B$ 528 with password $P_B$ 542 and hash the result. In another embodiment, high-entropy secret $S_B$ 548 may be equal to at least one of those values known by both Bob 504 and Alice 502, such as password $P_B$ 542, parameter $\alpha$, or parameter $\beta$.

In another embodiment, generating high-entropy secret $S_B$ 548 may include employing a plurality of combining functions, where each of the plurality of combining function produces a result. The first combining function may be employed on at least one of public key $M_A$ 526, password $P_B$ 542, and public key $M_B$ 528 to produce a result. Each of the subsequent combining functions may be employed on sequential combining function results and on at least one of public key $M_A$ 526, password $P_B$ 542, and public key $M_B$ 528, such that the result produced by the last combining function may be high-entropy secret $S_B$ 548. Examples include:

$$S_B = f(P_B, f(P_B, M_A, M_B)) \quad (548),$$

$$S_B = f(M_A, f(P_B, M_A, M_B), M_B, f(M_A, M_B)) \quad (548), \text{ and}$$

$$S_B = f(f(f(P_B, M_A), f(P_B, M_A, M_B))), f(M_B, M_B)) \quad (548).$$

Although the nomenclature of each combining function is illustrated as $f$, the combining functions need not be the same function, such that, for example, $$S_B = f_{B_1}(P_B, f_{B_2}(P_B, M_A, M_B)) \quad (548).$$

At step 550, Bob 504 may encrypt random number $N_B$ 524 with high-entropy secret S 548 (recall that it was assumed that $S = S_B$) to obtain encrypted nonce $(N_B)_S$ 550. This encryption may be performed using a symmetrical encryption algorithm. An example of a symmetrical encryption algorithm that may be used is the 56-bit Data Encryption Standard (DES).

At step 552, Bob 504 may superencrypt encrypted nonce $(N_B)_S$ 550 with session key $K_B$ 546 (recall that it was assumed that $K = K_B$) to create combining piece $((N_B)_S)_K$ 552. Each encryption may be symmetrical. Each encryption may incorporate a feedback mechanism. In one embodiment, the encryption may employ the block cipher CAST-128 (inventors Carlisle Adams and Stafford Tavares) with cipher block chaining (CBC) to add a feedback mechanism to the encryption device.

In an alternate embodiment, Bob 504 may encrypt random number $N_B$ 524 first with session key $K_B$ 546 and then superencrypt encrypted nonce $(N_B)_K$ with high-entropy secret $S_B$ 548 to create combining piece $((N_B)_K)_S$. However, the order of the encryption as illustrated in steps 550 and 552 (S first then K) is preferred for CBC mode encryption since this encryption order reduces the opportunity for eavesdropper Eve to conduct an offline attack with substantially known plaintext.

In an alternate embodiment, Bob 504 may encrypt random number $N_B$ 524 with password $P_B$ 542 and superencrypt the encrypted nonce $(N_B)_{P_B}$ with session key $K_B$ 546 to create the combining piece $(((N_B)_{P_B})_K$ or reverse the order to create the combining piece $(((N_B)_K)_{P_B}$. In another embodiment, step 552 may be eliminated and $(N_B)_S$ 550 may be transmitted at step 554.

In another embodiment, random number $N_B$ 524 may be encrypted with one of public key $M_A$ 526, parameter $\alpha$, parameter $\beta$, public key $M_B$ 528, session key K 546, password $P_B$ 542, and high-entropy secret S 548. The resulting encrypted nonce may be written as $(N_B)_f$ where $f = M_A$, $\alpha$, $\beta$, $M_B$, K, $P_B$, S, or any other value that may be known by the parties to session 500. Encrypted nonce $(N_B)_f$ may be superencrypted with one of public key $M_A$ 526, parameter $\alpha$, parameter $\beta$, public key $M_B$ 528, session key K 546, password $P_B$ 542, and high-entropy secret S 548. The resulting superencrypted nonce may be written as $((N_B)_f)_g$, where $f = M_A$, $\alpha$, $\beta$, $M_B$, K, $P_B$, S, or any other value that may be known by the parties to session 500 and $g = M_A$, $\alpha$, $\beta$, $M_B$, K, $P_B$, S, or any other value that may be known by the parties to session 500.

Where the parties desire to validate session key $K_B$ 546, one of the letters "f" and "g" may represent session key $K_B$ 546 and the other letter may represent one of public key $M_A$ 526, parameter α, parameter β, public key $M_B$ 528, session key $K_B$ 546, password $P_B$ 542, and high-entropy secret S 548 or any other value that may be known by the parties to session 500.

The superencryption of random number $N_B$ 524 may be written as $$(N_B)^{\Sigma^n{}_{i=2}}$$

where the variable "i=2" may represent an encryption of an encryption and the variable "n" represents the total number of encryptions such that n·2. Each encryption may be to a variable taken from the pool of variables known by the parties to session 500.

The superencryption of random number $N_B$ 524 may be where n is greater than one. For example, where n=3, the superencryption of random number $N_B$ 512 may be written as $$(((N_B)_f)_g)_h$$

Where the parties desire to validate session key $K_B$ 546, one of the letters "f", "g", and "h" may represent session key K 546 and the other letters may represent one of public key $M_A$ 526, parameter α, parameter β, public key $M_B$ 528, session key K 546, password $P_B$ 542, and high-entropy secret S 548 or any other value that may be known by the parties to session 500.

At step 554, Bob 504 may transmit to Alice 502 his public half of the key exchange, public key $M_B$ 528, as well as transmit the superencrypted nonce identified as combining piece $((N_B)_S)_K$ 552. By transferring his version of the session key K 546 as part of combining piece $((N_B)_S)_K$ 552 at step 554, Bob 504 may start the key verification phase before Alice 502 has constructed her version of the session key K 556. This may be distinguished from known methods which require Bob and Alice to possess their version of the session key ($K_B$ and $K_A$) prior to beginning the key verification phase. Moreover, transferring his version of the session key $K_B$ 546 as part of combining piece $((N_B)_S)_K$ 552 at step 554 permits Bob 504 and Alice 502 to conduct key verification and identity verification at the same time.

On receiving Bob's public key $M_B$ 528, Alice 502 may employ modulus exponentiation at step 556 to generate session key $K_A$ 556 as follows:

$$K_A = (M_B)^{R_A} \bmod \beta \tag{556}$$

Where $\alpha_A = \alpha_B$ and $\beta_A = \beta_B$, the session keys, $K_A$ and $K_B$, are designed to match since $K = K_A = K_B = \alpha^{R_A R_B} \bmod \beta$.

At step 558, Alice 502 may employ the combining function, f, to combine password $P_A$ 506 with Alice's public key $M_A$ 526 and Bob's public key $M_B$ 528 to produce high-entropy secret S 558. The different embodiments for K in step 546 and S in step 548 apply similarly to K in step 556 and S in step 558.

If the combining function or functions, f, used by Alice 502 in step 558 is the same as the combining function, f, used by Bob 504 in step 548, then authentication will occur assuming all else being equal. In other words, if the function and variables employed by Alice 502 in step 558 to produce high-entropy secret S 558 are the same as employed by Bob 504 in step 548 to produce high-entropy secret S 548, then S 558 will equal S 548.

At step 560, Alice 502 may decrypt the superencrypted nonce received from Bob 504, here combining piece $((N_B)_S)_K$ 552 to obtain $N_B$ 560 such that $$N_B = (((N_B)_S)_K)^{-1}{}_K)^{-1}{}_S \tag{560}$$

A subscript "A" (or 'Alice') to the subscript "B" (or 'Bob') as applied to the random nonce "N" as in $N_B$ may account for the fact that Alice's decryption of Bob's random nonce $N_B$ 524 may not reveal Bob's random nonce $N_B$ 524 in all cases. In other words, $N_B$ 560 may not always equal $N_B$ 524. For example, if Alice's $K_A$ 556 does not match Bob's $K_B$ 546 used to encrypt the nonce received from Bob 504, then $N_B \cdot N_B$. Moreover, if Alice's $S_A$ 558 does not match Bob's $S_B$ 548 used to encrypt the nonce received from Bob 504, then $N_B \cdot N_B$. However, we assume that they do match as is conventional in the art.

At step 562, Alice 502 may generate her own verification nonce, random number $N_A$ 562. Steps 556, 558 and 562 may occur in any order. However, step 560 must be completed after steps 556 and 558 have been performed.

Next, Alice 502 may modify $N_B$ 560 received from Bob 504 over transmission 554. At step 564, Alice 502 may modify $N_B$ 560 to obtain modified random number $N_B+1$ 564.

Modification, such as in step 564, may include any simple and effective modification of the nonce in a way that may be mutually known by both Alice 502 and Bob 504. Modifications to the nonce may include increasing the nonce in number, size, quantity, or extent through a positive or negative change. The modification may be a slight, barely perceptible augmentation such as incrementing by a value of one. Moreover, the modification may be one of a series of regular additions or contributions to the nonce such as by values or functions other than a value of one. Furthermore, the modification may be a reordering of the nonce, such as inverting or reversing the bits that make up the nonce.

After modifying $N_B$ 560 received from Bob 504 over transmission 554, Alice 502 may superencrypt her nonce, here random number $N_A$ 562, and Bob's modified nonce, here modified random number $N_B+1$ 564, first with high-entropy secret $S_A$ 558 at step 566, then with session key $K_A$ 556 at step 568. Alice 502 may then send the result, $$((N_A, N_B+1)_S)_K, \tag{568}$$

to Bob 504 at step 570.

The alternative encryption embodiments discussed in connection with step 550 and step 552 apply to steps 566 and 568 as well. Alternatively, Alice 502 may swap the variables $N_A$ and $N_B+1$ and transmit at step 570 $((N_B+1, N_A)_S)_K$ to Bob 504. However, even though the modified nonce, here $N_B+1$ 564, may significantly differ from the original nonce, here $N_B$ 560, $((N_A, N_B+1)_S)_K$ is preferred since placing random number $N_A$ 562 at the beginning of the string to be encrypted may change the resulting ciphertext that much more when used with a feedback mechanism such as cipher block chaining (CBC).

At step 572, Bob 504 may decrypt Alice's superencrypted payload $((N_A, N_B+1)_S)_K$ 568 to extract random number $N_A$ 574 and modified random number $N_B+1$ 576 received from Alice 502, such that $$N_A, N_B+1 = ((((N_A, N_B+1)_S)_K)^{-1}{}_K)^{-1}{}_S \tag{572}.$$

The order of key decryption may be a function of superencrypted payload $((N_A, N_B+1)_S)_K$ 568.

Bob 504 may next verify that Alice 502 did in fact correctly modify Bob's random number $N_B$ 524 by determining at step 578 whether modified random number $N_B+1$ 576 received from Alice 502 over transmission 570 less its modification is equal to Bob's random number $N_B$ 524.

If modified random number $N_B+1$ 576 less its modification is not equal to Bob's random number $N_B$ 524, Bob 504 may terminate session 500 at step 579. If this is the case, Alice 502 may be an invalid user. It will be appreciated that the verification may be achieved by comparing modified random number $N_B+1$ 576 received from Alice 502 with a similarly modified version of Bob's random number $N_B$ 524.

Recall that, at step 542, if Alice 502 was not in the user list of Bob 504, Bob 504 may generate random password $P_B$ 542 and continue session 500 with password $P_B$ 542. Continuing session 500 with password $P_B$ 542 avoids revealing to a potential attacker the validity of account names in the user list of Bob 504. Thus, if Bob 504 was not able to verify at step 536 that identity 508 was part of Bob's user list at step 536, then modified random number $N_B+1$ 576 less its modification will not match Bob's random number $N_B$ 524. Only in a hapless and very rare circumstance would password $P_A$ 506 match random password $P_B$ 542. Regardless of a hapless circumstance, Bob 504 will remember between steps 538 and 578 that Alice 502 is an invalid user such that, even if password $P_A$ 506 match random password $P_B$ 542, Bob 504 may terminate session 500 at step 579.

If modified random number $N_B+1$ 576 less its modification is equal to Bob's random number $N_B$ 524, then Bob 504 has verified that Alice 502 knows Bob's high-entropy secret $S_B$ 548 and has verified that Alice's session key $K_A$ 556 is equal to Bob's session key $K_B$ 546. If Bob 504 has verified that Alice 502 knows high-entropy secret $S_B$ 548 at step 578, Alice 502 is authenticated to Bob 504. Bob 504 may continue with session 500 at step 580.

From step 580, Bob 504 may have two choices. Bob 504 may proceed to step 581 and initiate an individually secure one way or two way communication link with Alice 502 or proceed to step 583 and continue to work towards establishing a mutually secure two way communication channel with Alice 502.

Bob 504 may open a one way or two way communication channel with Alice 502 with little risk to Bob 504 since Bob 504 now has identified Alice 502 (step 544) and authenticated the identity of Alice 502 (step 580). In other words, Bob 504 may now be reasonably certain that it is Alice 502 on the other end of transmission 503 and would risk little in accepting transmissions from Alice 502 or sending transmissions to Alice 502. However, Alice 502 has yet to identify or even authenticate that it is Bob 504 on the other end and would risk much to freely receive transmissions from Bob 504 or freely send transmissions to Bob 504.

A one way communication link may permit Bob 504 to receive transmissions from Alice 502 but prohibit Bob 504 from sending transmissions to Alice 502 or prohibit Alice 502 from receiving transmissions from Bob 504. An example of where transmissions 582 may be used is in a company that sells products in supermarkets. After the remote route salespersons have compiled their stocking and removal from stocking statistics in a handheld computer, each route salesperson may remotely open transmission 582 (such as over a telephone line) with the company server to upload stocking statistical data to the company server.

As noted above, Bob 504 may have two choices from step 580. Alternative to proceeding to step 581, Bob 504 may proceed to step 583 and continue to work towards establishing a mutually secure two way communication channel with Alice 502. At step 583, Bob 504 may generate a random string of bits identified as initialization vector $I_B$ 583 which may optionally be of zero length. Initialization vector $I_B$ 583 (or initializing variable or initial chaining value) may be used to make the message transmitted over transmission 503 unique and thus need not have any meaning outside of transmission 589. In one embodiment, initialization vector $I_B$ 583 may be a time stamp.

At step 584, Bob 504 may modify random number $N_A$ 574 received from Alice 502 over transmission 570 by modifying Alice's random number $N_A$ 574 to obtain $N_A+1$ 584. Again, as with step 564, Bob 504 may modify random number $N_A$ 574 in any way that Bob 504 and Alice 502 previously agreed upon. Bob 504 may then superencrypt initialization vector $I_B$ 583 and modified random number $N_A+1$ 584, first with the high-entropy secret $S_B$ 548 at step 586, and then with session key $K_B$ 546 at step 566 to produce the result, $$((I_B, N_A+1)_S)_K \quad (588).$$

This order of encryption (S first then K) is preferred for CBC mode encryption to reduce the amount of information given to eavesdropper Eve. The alternate encryption embodiments discussed in connection with steps 566 and 568 also apply to steps 586 and 588.

At step 589, Bob 504 may transmit the result $((I_B, N_A+1)_S)_K$ 588 to Alice 502. At step 590, Alice 502 may decrypt Bob's superencrypted payload $((I_B, N_A+1)_S)_K$ 588 to extract initialization vector $I_B$ 591 and modified random number $N_A+1$ 592, such that $$I_B 591, N_A+1\ 592 = ((((I_B, N_A+1)_S)_K)^{-1}{}_K)^{-1}{}_S.$$

Alice 502 may next verify that Bob 504 did in fact correctly modify Alice's random number $N_A$ 562 by determining at step 593 whether modified random number $N_A+1$ 592 received from Bob 504 over transmission 589 less its modification is equal to Alice's random number $N_A$ 562. If modified random number $N_A+1$ 592 less its modification is not equal to Alice's random number $N_B$ 562, Alice 502 may terminate session 500 at step 594.

Recall that if modified random number $N_B+1$ 576 less its modification matches random number $N_B$ 524 at step 578, then Bob 504 has verified that Alice 502 knows high-entropy secret $S_B$ 548. Concerning step 595, if modified random number $N_A+1$ 592 less its modification is equal to Alice's random number $N_B$ 562, Alice 502 may continue session 500 at step 595 since Alice 502 has verified that Bob 504 knows high-entropy secret $S_A$ 558.

If verification step 595 is true, Bob 504 may be identified and authenticated to Alice 502 so that Alice 502 may continue at step 595 to step 596. At step 596, Alice 502 may seek to open a mutually secure, two way communications with Bob 504.

After transmitting $((I_B, N_A+1)_S)_K$ 588 to Alice 502 at step 589, Bob 504 may continue at step 597 and seek to open a mutually secure, two way communications with Alice 502 at step 598. Where Alice 502 seeks to open a mutually secure, two way communications with Bob 504 and Bob 504 seeks to open a mutually secure, two way communications with Alice 502, mutually secure two way communication channel 599 may be established.

Unlike cleartext authentication, an embodiment of the invention does not provide Bob 504 with the secret password $P_A$ 506 at any time during or at the end of exchange 500. Moreover, at the end of session 500, Alice 502 now knows that Bob 504 knew secret password $P_A$ 506 at the start of session 500.

As an exchange protocol, session 500 resists man-in-the-middle and replay attacks due to the combination of two random numbers with the shared password, as well as resists spoofed server, spoofed client, and eavesdropping attacks.

Moreover, session 500 exhibits perfect backward secrecy and resists "session" key compromise.

Symmetrical superencryption of a random nonce with high-entropy secret $S_B$ 548 as one of the keys works to provide more security than employing a single encryption with low-entropy shared password $P_B$ 514. This may be due in part to the incorporation of random numbers into the key. Moreover, the superencryption may employ variables ($M_A$ 526 and $M_B$ 528) that are tied closely into the particular transmission exchange. Because $M_A$ 526 and $M_B$ 528 are random and specific to this particular session 500, the random number transmitted over transmission 503, here combining piece $((N_B)_S)_K$ 552, is also very specific to a single, one way transmission 554 in a single session 500. Since a single, one way transmission 554 in a single session 500 will not reoccur in session 500, session 500 provides more security by working against replay attacks. Moreover, due to the unpredictable possibilities of Alice's and Bob's public keys, $M_A$ 526 and $M_B$ 528 respectively, and Mallory's lack of knowledge of password $P_A$ 506, password $P_B$ 514 (or password $P_B$ 542), Mallory cannot generate either of high-entropy secret $S_B$ 548 or high-entropy secret $S_A$ 558. Where Mallory cannot generate high-entropy secret S, session 500 works against man-in-the-middle attacks.

FIGS. 6A and 6B illustrate session 600 of the invention. Recall that session 500 may include secure key exchange and authentication where Alice 502 may be the final verifier. Session 600 of FIGS. 6A and 6B may include secure key exchange and authentication where Bob 604 may be the final verifier.

In session 600, Alice 602 may store password $P_A$ 606 as associated with identity 608 at step 610. Identity 608 may be any transmittable device by which Alice 602 may be recognizable or known to Bob 604. Identity 608 may represent Alice 602, herself ("userid=Alice"). Storage by client Alice 602 may be through memorizing password $P_A$ 606 and identity 608 within her own mind.

At step 612, Bob 604 may store password $P_B$ 614 as associated with identity 616 in a secure location. Identity 616 may represent Alice 602, herself ("userid=Alice"). Where password $P_A$ 606 as associated with identity 608 equals password $P_B$ 614 as associated with identity 616, password $P_A$ 606 and password $P_B$ 614 may be referred to as a shared password. Where this shared password is only known to Alice 602 and Bob 604, the shared password may be referred to as a shared secret password.

At step 618, Alice 602 may generate random number $R_A$ 620 and random nonce or number $N_A$ 622. Generating random nonce $N_A$ 622 this early in session 600 permits Alice 602 to verify Bob 604 within two transmissions (here transmissions 636 and 664) such that Alice 602 may have the first informed opportunity to break off communications with server Bob 604. In comparison, Alice 502 only generated random number $R_A$ 518 at this similar step in session 500. This may work to give Bob 504 the first informed opportunity in session 500 to break off communications with Alice 502.

At step 624, Bob 604 may generate random number $R_B$ 626 and random number $N_B$ 628. Alice's random number $R_A$ 620 and Bob's random number $R_B$ 626 may be large, 512-bit random numbers and may serve as private keys for this session. Alice's random number $N_A$ 622 and Bob's random number $N_B$ 628 may serve as nonces for session 600. It is to be understood that random numbers $N_A$ 622, $R_A$ 620, $N_B$ 628 and $R_B$ 626 may be computed at any time prior to their first use, for example, random number $N_B$ 628 may be computed between steps 658 and 660.

To generate public key $M_A$ 630 at step 630, Alice 602 may set her public key $M_A$ 630 equivalent to constant parameter $\alpha_A$ raised to the exponential power of Alice's private, random key $R_A$ 620, modulo parameter $\beta_A$. To generate public key $M_B$ 632 at step 632, Bob 604 may set his public key $M_b$ 632 equivalent to parameter $\alpha_B$ raised to the exponential power of Bob's private key $R_B$ 614, modulo parameter $\beta_B$. Thus, $$M_A = (\alpha_A)^{R_A} \bmod \beta_A \qquad (630)$$

$$M_B = (\alpha_B)^{R_B} \bmod \beta_B \qquad (632).$$

At step 634, Alice 602 may encrypt random number $N_A$ 622 with password $P_A$ 606 to obtain encrypted random nonce $(N_A)_{P_A}$ 634. Alternatively, Alice 602 may superencrypt random number $N_A$ 622 with password $P_A$ 606 and at least one other variable known to both Alice 602 and Bob 604 or perform other encryption variations on random number $N_A$ 622 and password $P_A$ 606 as discussed in connection with step 550 and step 552 of FIG. 5A.

Encrypting random number $N_A$ 622 with password $P_A$ 606 works to accelerate the key verification phase so that the key verification phase may start with Alice 602 of FIGS. 6A and 6B rather than Bob 504 of FIGS. 5A and 5B.

In encrypting random number $N_A$ 622 with password $P_A$ 606, step 630 is distinguished from Encrypted Key Exchange (EKE—U.S. Pat. No. 5,241,599) in that encrypted random number $N_A$ 622 is not based on a first signal such as random number $R_A$ 620. In other words, EKE would encrypt public key $M_A$ 630 with password $P_A$ 606 whereas the present embodiment encrypts random number $N_A$ 622 with password $P_A$ 606.

Encrypting random number $N_A$ 622 with password $P_A$ 606 works to ensure that password $P_A$ 606 is not sent over transmission 603 in the clear and that password $P_A$ 606 encrypts a completely meaningless, random value, here random number $N_A$ 622. Thus, even though password $P_A$ 606 may be a low entropy shared secret, encrypting random number $N_A$ 622 with password $P_A$ 606 works to protect against offline password attacks. In addition, encrypting random number $N_A$ 622 with password $P_A$ 606 works to permit the key verification and the identity verification to be conducted at the same time.

At step 636, Alice 602 may transmit identity 608, public key $(N_A)_P$ 634, encrypted random nonce $(N_A)_{P_A}$ 634, and service request 638 to Bob 604. By transmitting public key $M_A$ 630 at step 636, the key verification phase may start well before Bob 604 even defines his version of the session key at step 654.

At step 640, Bob 604 may obtain password $P_B$ 614 and identity 616 from his user list based on identity 608 received from Alice 602 over transmission 636. The discussion in connection with password $P_B$ 514 of FIG. 5A also applies to password $P_B$ 614 of FIG. 6A.

At step 640, Bob 604 may verify that identity 608 received from Alice 602 equals identity 616 as obtained from Bob's user list. If identity 608 does not equal identity 616 at step 640, Alice 602 may be an invalid user as far as Bob 604 may be concerned and Bob 604 may proceed to step 644. At step 644, Bob 604 may end session 600 at step 646 or continue with session 600 and generate random password $P_B$ 648 at step 648. The discussion in connection with step 542 of FIG. 5A also applies to step 648 of FIG. 6A.

If identity 608 does equal identity 616 at step 642, Bob 604 may continue at step 650 with session 600. On continuing with session 600, Bob 606 may decrypt encrypted random nonce $(N_A)_{P_A}$ 634 to obtain random nonce $N_A$ 652, such that $$N_A = ((N_A)_{P_A})^{-1}{}_{P_B} \qquad (652).$$

Bob 606 next may employ modulus exponentiation on Alice's public key $M_A$ 630 at step 654 to generate private session key $K_B$ 646 as follows:

$$K_B = (M_A)^{R_B} \bmod \beta_B \quad (654).$$

At step 656, Bob 604 may employ a combining function, $f_B$, on password $P_B$ 614 (or password $P_B$ 648) and on the key exchange pieces of Alice's public key $M_A$ 630 and Bob's public key $M_B$ 632 to generate high-entropy secret $S_B$ 656. The discussion in connection with step 548 of FIG. 5A is applicable to step 656 of FIG. 6A. In other words, Bob 604 may employ alternate embodiments with different combining functions as discussed in connection with step 548 of session 500. Steps 652, 654, and 656 may be performed in any order.

At step 658, Bob 604 may modify $N_A$ 652 to obtain modified random number $N_A+1$ 658. The discussion on modification techniques in connection with step 564 of FIG. 5A is applicable to step 658 in FIG. 6A.

After modifying $N_A$ 652 received from Alice 602 over transmission 636, Bob 604 may superencrypt his random number $N_B$ 628, and Alice's modified random number $N_A+1$ 658, first with high-entropy secret $S_B$ 656 at step 660, then with session key $K_B$ 654 at step 662 to produce the result $$((N_B, N_A+1)_S)_K \quad (662).$$

The alternative encryption embodiments discussed in connection with step 586 and step 588 of FIG. 5B apply to steps 660 and 662 of FIG. 6A as well. a10

At step 664, Bob 604 may transmit Bob's public key $M_B$ 632 and the resulting ciphertext $((N_B, N_A+1)_S)_K$ 662 to Alice 602.

On receiving Bob's public key $M_B$ 632, Alice 602 may employ modulus exponentiation at step 665 to generate Alice's version of the session key as follows:

$$K = K_A = (M_B)^{R_A} \bmod \beta_A \quad (665).$$

Alice 602 next may employ the combining function, $f$, to generate Alice's version of the high-entropy secret. At step 668, Alice may combine password $P_A$ 606 with Alice's public key $M_A$ 630 and Bob's public key $M_B$ 632 to produce high-entropy secret $S_A$ 668. Similar to step 558 of FIG. 5A, if the function and variables employed by Alice 602 in step 668 to produce high-entropy secret $S_A$ 668 are the same as employed by Bob 604 in step 656 to produce high-entropy secret $S_B$ 656, then $S_A$ 668 will equal $S_B$ 656 such that this common high-entropy secret is shared by both Alice 602 and Bob 604.

At step 670, Alice 602 may decrypt Bob's superencrypted payload $((N_B, N_A+1)_S)_K$ 662 to obtain $N_B$ 672 and $N_A+1$ 674 by reversing the order of encryption employed by Bob 604 at steps 660 and 662.

Alice 602 may next verify that Bob 604 did in fact correctly modify Alice's random number $N_A$ 622 by determining at step 676 whether modified random number $N_A+1$ 674 received from Bob 604 over transmission 664 less its modification is equal to Alice's random number $N_A$ 622. The discussion on verification techniques in connection with step 578 of FIG. 5 is equally applicable to step 676.

If modified random number $N_A+1$ 674 less its modification is not equal to Alice's random number $N_A$ 622, Alice 602 may terminate session 600 at step 677. If modified random number $N_A+1$ 674 received from Bob 604 over transmission 664 less its modification is equal to Alice's random number $N_A$ 622, Alice 602 may continue to step 678.

From step 678, Alice 602 may have two choices. Alice 602 may proceed to step 679 and initiate an individually secure one way or two way communication link with Bob 604 or proceed to step 681 and continue to work towards establishing a mutually secure two way communication channel with Bob 604.

Alice 602 may open a one way or two way communication channel with Bob 604 with little risk to Alice 602 since Alice 602 has now verified that Bob's version of their shared secret $P_B$ 614 matches Alice's version $P_A$ 606. In other words, Alice 602 may now be secure that it is Bob 604 on the other end of transmission 603 and would risk little in accepting transmissions from Bob 604 or sending transmissions to Bob 604. However, although Bob 604 may have identified Alice 602 at step 650, Bob 604 has yet to authenticate that it is Alice 602 on the other end of transmission 603 and would risk much to freely receive transmissions from Alice 602 or freely send transmissions to Alice 602.

A one way communication link may permit Alice 602 to receive transmissions from Bob 604 but prohibit Alice 602 from sending transmissions to Bob 604 or prohibit Bob 604 from receiving transmissions from Alice 602. An example of where transmissions 680 may be used is to securely stream Moving Picture Experts Group 1 (MPEG-1) audio layer 3 (MP3) compressed music specifically to Alice 602 from Bob 604 over transmission 603 once one way communication 680 is established.

Alternative to proceeding to step 679, Alice 602 may proceed to step 681 and continue to work towards establishing a mutually secure two way communication channel with Bob 604. At step 681, Alice 602 may generate initialization vector $I_A$ 681. Alice 602 then may modify random number $N_B$ 672 at step 682. Again, as with step 564 of FIG. 5A, Alice 602 may modify random number $N_B$ 672 in any way that Bob 604 and Alice 602 previously agreed upon.

Alice 602 may then superencrypt initialization vector $I_A$ 681 and modified random number $N_B+1$ 682, first with the high-entropy secret $S_A$ 668 at step 683, and then with session key $K_A$ 665 at step 684 to produce the result, $$((I_A, N_B+1)_S)_K \quad (684).$$

The alternate encryption embodiments discussed in connection with steps 566 and 568 of FIG. 5A also apply to steps 683 and 684 of FIG. 6B. At step 685, Alice 602 may transmit the result $((I_A, N_B+1)_S)_K$ 684 to Bob 604.

At step 686, Bob 604 may decrypt Alice's superencrypted payload $((I_A, N_B+1)_S)_K$ 684 to extract initialization vector $I_A$ 687 and modified random number $N_B+1$ 688. Bob 604 may next verify at step 690 whether modified random number $N_B+1$ 688 received from Alice 602 over transmission 685 less its modification is equal to Bob's random number $N_B$ 628. If modified random number $N_B+1$ 688 less its modification is not equal to Bob's random number $N_B$ 628, Bob 604 may terminate session 600 at step 692. As was the case in the discussion with reference to step 579 of FIG. 5A, in a hapless case, Bob 604 will remember between steps 648 and 690 that Alice 602 is an invalid user and may accordingly terminate the session at step 692.

If modified random number $N_B+1$ 688 less its modification is equal to Bob's random number $N_B$ 628, Bob 604 may continue session 600 at step 693 since Bob 604 has verified that Alice 602 knows high-entropy secret $S_B$ 656. Verifying that Alice 602 knows high-entropy secret $S_B$ 656 authenticates Alice 602 to Bob 604 (as well as identifies Alice 602 to Bob 604). Alice 602 may have been identified to Bob 604 at step 650 as well. Thus, if verification step 693 is true, Alice 602 may be identified and authenticated to Bob 604 so that Bob 604 may continue at step 693 to step 694. At step 694, Bob 604 may seek to open a mutually secure, two way communications with Alice 602.

After transmitting $((I_A, N_B+1)_S)_K$ 684 to Bob 604 at step 685, Alice 602 may continue at step 696 and seek to open a mutually secure, two way communications with Bob 604 at step 698. Where Bob 604 seeks to open a mutually secure, two way communications with Alice 602 and Alice 602 seeks to open a mutually secure, two way communications with Bob 604, mutually secure two way communication channel 699 may be established.

Embodiment 500 of FIGS. 5A and 5B may be used in situations where it may be more important for the server to have the first opportunity to break off communications, such as a false client situation. For example, servers hosting web pages of ebay.com, yahoo.com, the United States White House, the United States Pentagon, presidential candidates, and radio talk show hosts may want to employ embodiment 500 so as to have the first opportunity to break off communications (step 580 of FIG. 5A) during repeat attacks that attempt to overload these web sites with requests so as to shut them down.

Session 500 of FIGS. 5A and 5B may be based on the Diffie-Hellman key exchange. However, any suitable key exchange protocol will work. For example, Fast Elliptical Encryption (FEE—see U.S. Pat. No. 5,463,690, U.S. Pat. No. 5,159,632, and U.S. Pat. No. 5,271,061), Communications Setup (COMSET), Shamir's three-pass protocol, and Tatebayashi-Matsuzaki-Newman key exchange algorithms may be substituted for the Diffie-Hellman key exchange in session 500. Substituting a different key exchange protocol may involve replacing the computations of steps 526, 528, 546, and 556 with those computations applicable to the particular protocol.

Embodiment 600 of FIGS. 6A and 6B may be used in situations where it may be more important for the client to have the first opportunity to break off communications, such as a false server situation. For example, a server hosting an electronic store may want to employ embodiment 600 to allow their customers passing their credit card number over the Internet to have the first opportunity to break off communications (step 678 of FIG. 6A). This may instill in the customer a greater sense of security in conducting transactions over the Internet.

One of the advantages of session 600 is that session 600 includes three transmissions over transmission network 603, which is two network transmissions less than Diffie-Hellman key exchange 200/verification 300 of FIG. 2 and FIG. 3 above. Moreover, although FIGS. 6A and 6B incorporate aspects of the Diffie-Hellman key exchange, any suitable key exchange protocol may be substituted into FIGS. 6A and 6B. This may require appropriate substitutions in the computations of steps 630, 632, 654, and 665.

Session 500 and session 600 may be altered in that a step may be added after the false verification steps (538, 579, 594, 644, 677, and 692) that returns the session to a prior step, such as the beginning of each session. This return step may be limited to two or three returns before ending the communication session.

In the above client-server model embodiments of FIGS. 5A and 5B and FIGS. 6A and 6B, Alice may represent a client seeking to authenticate to Bob to request services. However, Bob may be a client and Alice may be a server so that server-client models, server-server models, or client-client models also are encompassed within the scope of the subject matter of the claimed terms. Employing more than two parties per model (such as including at least one the parties of Carol and Dave) also may be encompassed within the scope of the subject matter of the claimed terms.

FIG. 7 illustrates an embodiment of the invention employed in Internet 700. Internet 700 may be any global information system that may be logically linked together by a globally unique address space based on an Internet Protocol (IP) or its subsequent extensions/follow-ons and may be able to support communications using the Transmission Control Protocol/Internet Protocol (TCP/IP) suite or its subsequent extensions/follow-ons, and/or other IP-compatible protocols. In one embodiment, Internet 700 may provide, use or make accessible, either publicly or privately, high level services layered on the communications and related infrastructure.

Internet 700 may include client computer systems 708, 710, 712, and 714 and server computer system 718 coupled to World Wide Web (WWW) 702. Client access to World Wide Web 702 may be provided by Internet Service Providers (ISPs), such as ISP 704 and ISP 706. Users on client computer systems, such as clients 708, 710, 712, and 714, may be unrestricted public members and may obtain access to World Wide Web 702 through Internet Service Providers, such as ISP 704 and ISP 706. Access to World Wide Web 702 may allow users of clients 708, 710, 712, and 714 to receive, view, and interact with Web pages. These Web pages may be provided by Web server systems, such as Web server system 716. Web server system 716, like ISP 704 and ISP 706, may be considered to be "on" World Wide Web 702. Often, these Web server systems are provided by the ISPs themselves, such as ISP 704, although a computer system may be set up and connected to World Wide Web 702 as part of Internet 700 without that computer system being also an ISP.

Web server system 716 may be at least one computer system that operates as a server computer system and may be configured to operate with the protocols of World Wide Web 702 as part of Internet 700. For example, web server system 716 may be server Bob 504 of FIGS. 5A and 5B or server Bob 604 of FIGS. 6A and 6B. Optionally, Web server system 716 of FIG. 7 may be part of an ISP that provides access to World Wide Web 702 client systems. Web server system 716 may be coupled to server computer system 718, where server computer system 718 itself may be coupled to other devices, such as order form 711. Order form 711 may involve putting together a shopping order for consumer products.

It will be appreciated that while two computer systems (716 and 718) are shown in FIG. 7, Web server system 716 and server computer system 718 may be one computer system having different software components providing the Web server functionality and the server functionality provided by server computer system 718. This will be described further below in connection with FIG. 8.

Internet symbiosis may be thought of as a close, prolonged association between two or more different Internet organisms of the same or different species that may, but does not necessarily, benefit each member. ISP 704 may provide Internet symbiosis such as World Wide Web connectivity to client computer system 708 through modem interface 720. Modem interface 720 may be considered separate or apart from client computer system 708. In a similar fashion, ISP 706 may provide Internet symbiosis for client computer systems 710, 712, and 714.

Although client computer systems 710, 712, and 714 may be in relationships of mutual benefit with or dependence upon World Wide Web 702 similar to client computer system 708, the connections need not be the same for client computer systems 710, 712, and 714 as shown in FIG. 7. Client computer system 710 may be coupled through modem interface 722 while client computer systems 712 and 714 may be part of a Local Area Network (LAN). The LAN may include network interfaces 724 and 726, LAN connections 728, and gateway computer system 730. Network interfaces 724 and 726 may be Ethernet network or other network interfaces. Client computer systems 712 and 714 may be coupled to LAN connections 728 through network interfaces 724 and 726. To provide firewall and other Internet related services for the local area network, LAN connections 728 may be further coupled to gateway computer system 730. Gateway computer system 730, in turn, may be coupled to ISP 706 to provide Internet symbiosis to the client computer systems 712 and 714.

Client computer systems 708, 710, 712, and 714 may each view Hyper Text Markup Language (HTML) pages or other digital media provided by the Web server system 716 when provided with the appropriate Web browsing software. These client computer systems may be a personal computer system, a network computer, a WebTV system, a wireless system, or other network enabled computing device. Moreover, gateway computer system 730 may be, for example, a conventional server computer system. Also, Web server system 716 may be a conventional server computer system. And, although FIG. 7 shows interfaces 720 and 722 as "modems," it will be appreciated that each of these interfaces may be an analog modem, Integrated Services Digital Network (ISDN) modem, cable modem, cellular or other wireless interface, satellite transmission interface (for example, "DirectPC"), or other interface to couple a computer system to other computer systems.

Figure 8:
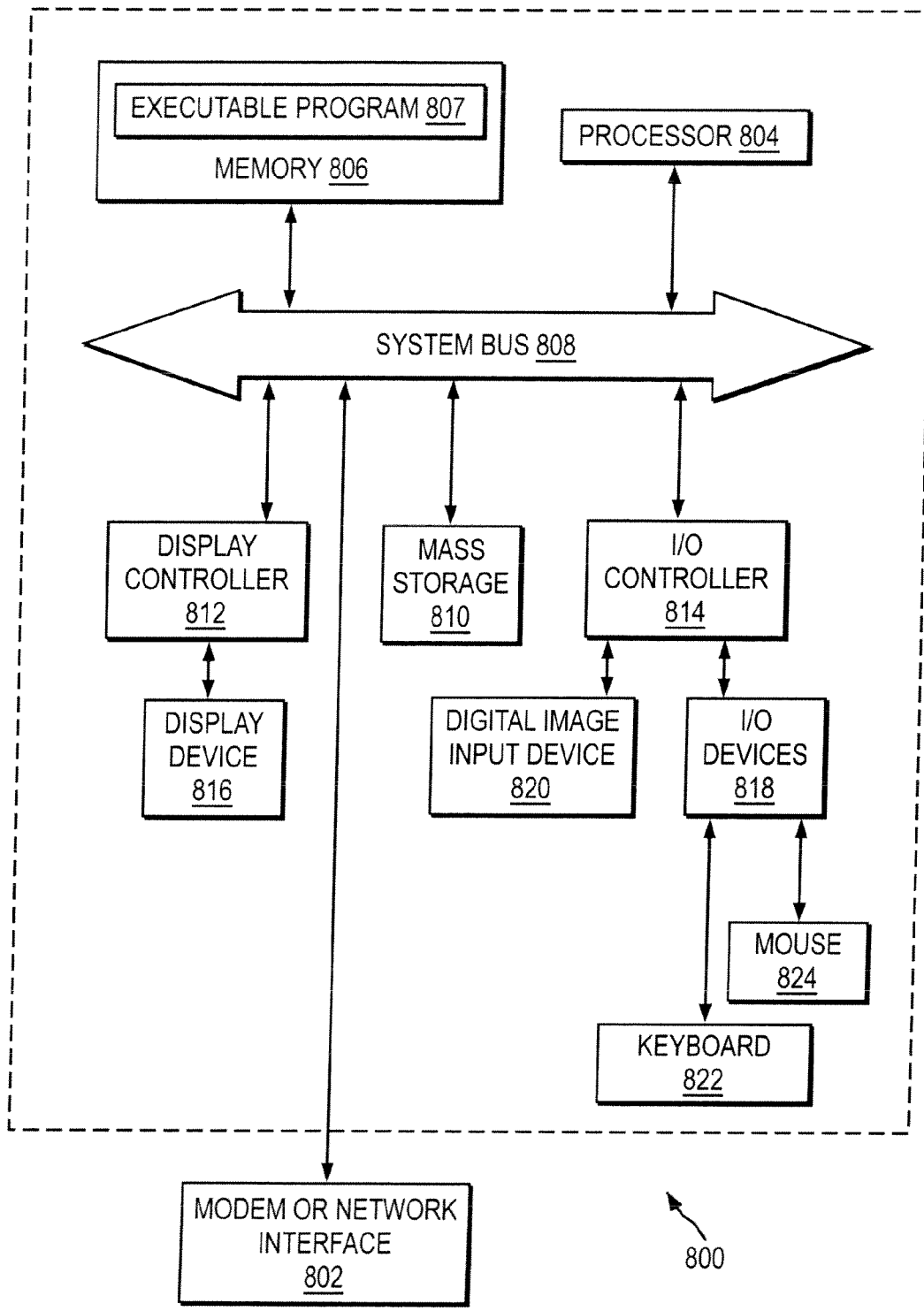
FIG. 8 shows one example of conventional computer system 800 that may be used with the invention.

FIG. 8 shows one example of conventional computer system 800. Computer system 800 may be used, for example, as client computer systems 708, 710, 712, and 714, Web server system 716, or server computer system 718 of FIG. 7. It will also be appreciated that such a computer system may be used to perform many of the functions of an Internet Service Provider, such as ISP 704 or ISP 706.

Computer system 800 may interface with external systems through the modem or network interface 802. Modem or network interface 802 may be considered to be part of computer system 800 and may be an analog ISDN or cable modem, Ethernet or Token Ring interface, wireless or infrared transceiver, satellite transmission interface (for example, "DirectPC"), or other interface to couple a computer system to other computer systems. Computer system 800 may include processor 804, which may be a conventional microprocessor such as an Intel Pentium microprocessor or Motorola PowerPC microprocessor or may be a large, central processing unit as found in International Business Machine (IBM) mainframes. Memory 806 may be coupled to processor 804 through system bus 808. System bus 808 also may couple mass storage 810, display controller 812, and input/output (I/O) controller 814 to processor 804 and memory 806, as well as to each other. Computer system 800 alternatively may couple mass storage 810 and modem or network interface 802 to system bus 808 via I/O controller 814 such that mass storage 810 and modem or network interface 802 may be part of I/O devices 818.

Memory 806 may be dynamic random access memory (DRAM) and may also include static RAM (SRAM) and read-only memory (ROM). Within memory 806 may be executable programs 807. Memory 806 may be a distributed readable storage medium containing executable computer program instructions which, when executed, cause at least one of a client computer system and a server computer system to perform a key exchange and authentication as set out in FIGS. 5A and 5B or FIGS. 6A and 6B. Memory 806 also may be a computer readable storage medium containing executable computer program instructions which, when executed, cause server computer system 718 to perform a key exchange and authentication as set out in FIGS. 5A and 5B or FIGS. 6A and 6B.

Display controller 812 may control in the conventional manner a display on a display device 816. Display device 816 may be a cathode ray tube (CRT), liquid crystal display, or other display. The input/output (I/O) devices 818 may be coupled to I/O controller 814 and may include keyboard 822, disk drives, printers, a scanner, and other input or output devices, including mouse 824 or other pointing device. Display controller 812 and I/O controller 814 may be implemented with conventional, well-known technology. Digital image input device 820 may be a digital camera coupled to I/O controller 814 to allow images from the digital camera to be input into computer system 800. Mass storage 810 may be a magnetic hard disk, an optical disk, or another form of storage for large amounts of data. Some of this data may be written into memory 806 by a direct memory access process during execution of software in computer system 800.

It will be appreciated that computer system 800 may be one example of many possible computer systems that have different architectures. For example, personal computer systems often have multiple buses, one of which may be considered to be a peripheral bus. Network computers may also be considered to be a computer system that may be used with the present invention. Network computers need not include a hard disk or other mass storage while executable programs 807 may be loaded from a network connection into memory 806 for execution by processor 804. A WebTV system or other embedded computing device may be considered to be a computer system according to the present invention, even though it excludes certain features shown in FIG. 8, such as certain input or output devices.

A computer system may include at least a processor, memory, and a bus coupling the memory to the processor. Operating system software that may control computer system 800 may include a file management system, such as a disk operating system, which may be part of the operating system software. The file management system may be stored in mass storage 810 and causes processor 804 to execute the various operations required by the operating system to input or output data and to store data in memory, including storing files on mass storage 810.

In operation, computer system 800, acting as server computer system 718 through an application program 807, may place pages 900 of FIG. 7 at the disposal of client computer systems 708, 710, 712, and/or 714. Pages 900 preferably are originated by executable programs 807 of FIG. 8. In a preferred embodiment, pages 900 include one or more Web pages that request at least one of user identification 902 or password 904. Processor 804 may generate pages 900 as files containing at least one device for entry or selection of at least one of user identification 902 or password 904 using a browser at client computer systems 708, 710, 712, and/or 714. Processor 804 may then transmit these files through the network of Internet 700 to client computer systems 708, 710, 712, and/or 714 illustrated in FIG. 7.

The logical operations required to distribute or bring pages 900 to the computer screen of a client are conventional. To begin, a consumer may send a request for pages 900 to server computer system 718 using a browser at client computer systems 708, 710, 712, and/or 714. Server computer system 718 may contain executable programs 807 that may be adapted to generate the files containing at least one device for entry or selection of at least one of user identification 902 or password 904. The request from the client or user may contain the address of the server, here server computer system 718, and the subaddress of the program file at the server, here executable programs 807. In Internet protocol, this complete address may be a locator string that may be referred to as the uniform resource locator (URL).

The user may send the request by entering the desired locator string in the browser URL space provided on pages 900. Alternatively, the client may depress an electronic link button illustrating a mark such as a trademark. The electronic link button may be located on one of several Web pages and may be programmed to enter the desired locator string in the browser URL space of the client.

On receiving the request, server computer system 718 may invoke executable programs 807 to build the HTML page file and send the HTML page file to the browser that requested the Web page. On receiving the HTML page file, client computer systems 708, 710, 712, and/or 714 may store the file in memory 806 and use this stored file to build and display Web pages 900 on display 816 of the client computer system.

The exemplary embodiments described herein are provided merely to illustrate the principles of the invention and should not be construed as limiting the scope of the subject matter of the terms of the claimed invention. The principles of the invention may be applied toward a wide range of systems to achieve the advantages described herein and to achieve other advantages or to satisfy other objectives, as well.

What is claimed is:

1. A cryptographic method, including:
   generating, at a first entity, a first public key $M_B$, the first public key $M_B$ being session specific;
   receiving from a second entity, at the first entity, a second public key $M_A$, the second public key $M_A$ being session specific;
   generating, at the first entity, a first secret $S_B$ by hashing one or more parameters that are known to the first entity and the second entity, at least one of the parameters being a result of hashing one or more of the following: a first password $P_B$, the first public key $M_B$, and the second public key $M_A$;
   generating, at the first entity, a first session key $K_B$, the first session key $K_B$ being different from the first secret $S_B$, both the first session key $K_B$ and the first secret $S_B$ being computed from the second public key $M_A$;
   encrypting, at the first entity, a first random nonce $N_B$ with the first session key $K_B$ or the first secret $S_B$ to obtain a first encrypted result;
   encrypting, at the first entity, the first encrypted result with the other one of the first session key $K_B$ or the first secret $S_B$ to obtain an encrypted random nonce;
   transmitting the encrypted random nonce from the first entity to the second entity;
   receiving a response to the encrypted random nonce; and
   authenticating through determining whether the response includes a correct modification of the first random nonce $N_B$.

2. The method of claim 1 wherein authenticating through determining whether the response includes a correct modification includes:
   checking whether a received modification of the first random nonce $N_B$ equals a modification of the first random nonce $N_B$ applied by the first entity.

3. The method of claim 1 wherein said authenticating includes:
   checking whether a received modification of the first random nonce less a modification thereof as applied thereto by the first entity equals the first random nonce.

4. The method of claim 1 wherein generating the first session key $K_B$ includes:
   generating a first random number $R_B$, and
   computing the first session key $K_B$ from the second public key $M_A$ raised to the exponential power of the first random number $R_B$, modulo a parameter $\beta_B$.

5. The method of claim 1 wherein said generating the first secret $S_B$ includes:
   combining the second public key $M_A$ and the first public key $M_B$ with a first password $P_B$ to produce a first result, and
   hashing the first result with a secure hash.

6. The method of claim 5 wherein the secure hash is a one-way hash function.

7. The method of claim 6 wherein the one-way hash function is one of the Secure Hash Algorithm, the Message Digest 5, Snefru, Nippon Telephone and Telegraph Hash, and the Gosudarstvennyl Standard.

8. The method of claim 1 wherein said generating the first secret $S_B$ includes:
   combining a first password $P_B$ and at least one of the second public key $M_A$ and the first public key $M_B$ to generate a first combined result, and
   combining the first combined result and at least one of the second public key $M_A$, the first password $P_B$, and the first public key $M_B$ to generate a second combined result.

9. The method of claim 1 wherein the first random nonce $N_B$ is encrypted using a symmetrical encryption algorithm.

10. The method of claim 9, wherein the symmetrical encryption algorithm is one of the Data Encryption Standard and the block cipher CAST.

11. The method of claim 1 wherein encrypting the first random nonce $N_B$ includes superencrypting the first random nonce $N_B$.

12. The method of claim 11, wherein superencrypting the first random nonce $N_B$ includes:
    encrypting the first random nonce $N_B$ with the first secret $S_B$ to produce the first encrypted result; and
    encrypting the first encrypted result using the first session key $K_B$.

13. The method of claim 12 wherein said authenticating includes:
    decrypting the response using the first session key $K_B$ to generate a first decrypted result; and
    decrypting the first decrypted result using the first secret $S_B$.

14. The method of claim 1, wherein the response includes a combination of a second random nonce $N_A$ and a modification of the first random nonce;
    and wherein the method further includes:
    extracting the second random nonce $N_A$ from the response;
    modifying the second random nonce $N_A$ to obtain a modified second random nonce;
    encrypting the modified second random nonce using the first session key $K_B$ and the first secret $S_B$ to obtain an encrypted package; and
    transmitting the encrypted package from the first entity.

15. The method of claim 14 wherein said encrypting the modified second random nonce includes:
    generating a string of random bits $I_B$;
    encrypting a combination of the string of random bits $I_B$ and the modified second random nonce using the first secret $S_B$ to generate a first result; and
    encrypting the first result using the first session key $K_B$.

16. The method of claim 14 wherein the encrypted package is transmitted for authentication of the first entity in opening a two-way communication channel.

17. A computer readable storage medium containing executable computer program instructions which, when executed, cause a first computer system to perform a cryptographic method including:

generating, at the first computer system, a first public key $M_B$, the first public key $M_B$ being session specific;

receiving from a second computer system, at the first computer system, a second public key $M_A$, the second public key $M_A$ being session specific;

generating, at the first computer system, a first secret $S_B$ by hashing one or more parameters that are known to the first computer system and the second computer system, at least one of the parameters being a result of hashing one or more of the following: a first password $P_B$, the first public key $M_B$, and the second public key $M_A$;

generating, at the first computer system, a first session key $K_B$, the first session key $K_B$ being different from the first secret $S_B$, both the first session key $K_B$ and the first secret $S_B$ being computed from the second public key $M_A$;

encrypting, at the first computer system, a first random nonce $N_B$ with the first session key $K_B$ or the first secret $S_B$ to obtain a first encrypted result;

encrypting, at the first computer system, the first encrypted result with the other one of the first session key $K_B$ or the first secret $S_B$ to obtain an encrypted random nonce;

transmitting the encrypted random nonce from the first computer system to the second computer system; and authenticating through determining whether a response to the encrypted random nonce includes a correct modification of the first random nonce $N_B$.

18. A distributed readable storage medium containing executable computer program instructions which, when executed, cause a first computer system and a second computer system to perform a computer cryptographic method through a network, the method comprising:

generating at the first computer system a first public key $M_B$, the first public key $M_B$ being session specific;

generating at the second computer system a second public key $M_A$, the second public key $M_A$ being session specific;

receiving at the first computer system the second public key $M_A$;

generating, at the first computer system, a first secret $S_B$ by hashing one or more parameters that are known to the first computer system and the second computer system, at least one of the parameters being a result of hashing one or more of the following: a first password $P_B$, the first public key $M_B$, and the second public key $M_A$;

generating at the first computer system a session key $K_B$, the session key $K_B$ being different from the first secret $S_B$, both the session key $K_B$ and the first secret $S_B$ being computed from the second public key $M_A$;

generating at the first computer system a first random nonce $N_B$;

encrypting at the first computer system the first random nonce $N_B$ with the first session key $K_B$ or the first secret $S_B$ to obtain a first encrypted result;

encrypting at the first computer system the first encrypted result with the other one of the first session key $K_B$ or the first secret $S_B$ to obtain an encrypted random nonce;

transmitting the encrypted random nonce and the first public key $M_B$ from the first computer system to the second computer system to establish the session key at the second computer system;

receiving at the first computer system from the second computer system a response to the encrypted random nonce; and authenticating the second computer system at the first computer system through determining whether the response includes a correct modification of the first random nonce $N_B$.

19. A computer system for performing a cryptographic method through a network, the computer system comprising:

a processor;

a network interface coupled to the network and coupled to the processor, the network interface to receive a request including information on a user identification; and a storage device coupled to the processor, the storage device to store a user password corresponding to the user identification, and wherein the processor is to perform a method, including:

receiving a second public key $M_A$ through the network interface from a second computer system, the second public key $M_A$ being session specific;

generating, at the first computer system, a first secret $S_B$ by hashing one or more parameters that are known to the first computer system and the second computer system, at least one of the parameters being a result of hashing one or more of the following: a first password $P_B$, the first public key $M_B$, and the second public key $M_A$;

generating a first session key $K_B$, the session key $K_B$ being different from the first secret $S_B$, both the session key $K_B$ and the first secret $S_B$ being computed from the second public key $M_A$;

generating a first public key $M_B$, the first public key $M_B$ being session specific;

generating a first random nonce $N_B$, the first random nonce $N_{BB}$;

encrypting the first random nonce $N_B$ with the session key $K_B$ or the first secret $S_B$ to obtain a first encrypted result;

encrypting the first encrypted result with the other one of the session key $K_B$ or the first secret $S_B$ to obtain an encrypted random nonce;

transmitting the encrypted random nonce and the first public key $M_B$ through the network interface;

authenticating through determining whether a response to the encrypted random nonce includes a correct modification of the first random nonce.

20. The computer system of claim 19 wherein the network is a network operating according to a hypertext transfer protocol; and the first public key $M_B$ is transmitted with the encrypted random nonce for session key exchange.

21. A cryptographic method, comprising:

receiving at a first entity a second public key $M_A$ and an encrypted second random number from a second entity;

generating a first secret $S_B$ by hashing one or more parameters that are known to the first entity and the second entity, at least one of the parameters being a result of hashing one or more of the following: a first password $P_B$, a first public key $M_B$, and the second public key $M_A$;

generating a first session key $K_B$, the session key $K_B$ being different from the first secret $S_B$, both the session key $K_B$ and the first secret $S_B$ being computed from the second public key $M_A$;

decrypting, using the first secret $S_B$ and the first session key $K_B$, to retrieve a second random number $N_A$ from the encrypted second random number;

modifying the second random number $N_A$ to obtain a modified second random number;

encrypting the modified second random number with the first session key $K_B$ or the first secret $S_B$ to obtain a first encrypted result;

encrypting the first encrypted result with the other one of the first session key $K_B$ or the first secret $S_B$ to obtain an encrypted random package; and transmitting the encrypted random package from the first entity.

22. The method of claim 21, wherein said decrypting includes:

decrypting the encrypted second random number using the first session key $K_B$ to generate the first decrypted result; and decrypting the first decrypted result using at least a first password $P_B$ and the second public key $M_A$.

23. The method of claim 21 wherein said generating the first session key $K_B$ includes:

generating a first random number $R_B$, and computing the first session key $K_B$ from the second public key $M_A$ raised to the exponential power of the first random number $R_B$, modulo a parameter $\beta_B$.

24. The method of claim 21 wherein said generating the first secret $S_B$ includes:

combining the first public key $M_B$ with the first password $P_B$ to produce a first result, and hashing the first result with a secure hash.

25. The method of claim 24 wherein the secure hash is a one-way hash function.

26. The method of claim 25 wherein the one-way hash function is one of the Secure Hash Algorithm, the Message Digest 5, Snefru, Nippon Telephone and Telegraph Hash, and the Gosudarstvennyl Standard.

27. The method of claim 21 wherein said generating the first secret $S_B$ includes:

combining the first password $P_B$ and the first public key $M_B$ to generate a first combined result, and combining the first combined result and at least one of the second public key $M_A$, the first password $P_B$, and the first public key $M_B$ to generate the first secret $S_B$.

28. The method of claim 21, wherein said encrypting the modified second random number includes superencrypting the modified second random number.

29. The method of claim 21, further including:

generating a first random number $N_B$; and wherein said encrypting the modified second random number includes:

encrypting a combination of the first random number $N_B$ and the modified second random number.

30. The method of claim 29 which further includes:

receiving at the first entity a response to the encrypted random package;

decrypting the response to obtain a combination of a string of random bits and a modified first random nonce; and retrieving the modified first random nonce from the combination of the string of random bits and the modified first random nonce;

determining whether the modified first random nonce was correctly modified from the first random number $N_B$.

31. The method of claim 30 wherein said determining whether the modified first random nonce was correctly modified includes:

checking whether the modified first random nonce equals a modification of the first random nonce as applied to the first random nonce by the first entity.

32. The method of claim 30 wherein said determining whether the modified first random nonce was correctly modified includes:

checking whether the modified first random nonce less a modification thereof as applied thereto by the first entity equals the first random nonce.

33. A computer readable storage medium containing executable computer program instructions which, when executed, cause a first computer system to perform a cryptographic method including:

receiving at the first computer system a second public key $M_A$ and an encrypted second random number from a second computer system;

generating a first secret $S_B$ by hashing one or more parameters that are known to the first computer system and the second computer system, at least one of the parameters being a result of hashing one or more of the following: a first password $P_B$, a first public key $M_B$, and the second public key $M_A$;

generating a first session key $K_B$, the session key $K_B$ being different from the first secret $S_B$, both the session key $K_B$ and the first secret $S_B$ being computed from the second public key $M_A$;

decrypting, using the first secret $S_B$ and the first session key $K_B$, to retrieve the second random number $N_A$ from the encrypted second random number;

modifying the second random number $N_A$ to obtain a modified second random number;

encrypting the modified second random number with the first session key $K_B$ or the first secret $S_B$ to obtain a first encrypted result;

encrypting the first encrypted result with the other one of the first session key $K_B$ or the first secret $S_B$ to obtain an encrypted random package;

transmitting the encrypted random package from the first computer system for authentication.

34. A distributed readable storage medium containing executable computer program instructions which, when executed, cause a first computer system and a second computer system to perform a cryptographic method through a network, the method including:

receiving, from the second computer system and at the first computer system, a second public key $M_A$ and an encrypted second random number;

generating a first secret $S_B$ by hashing one or more parameters that are known to the first computer system and the second computer system, at least one of the parameters being a result of hashing one or more of the following: a first password $P_B$, a first public key $M_B$, and the second public key $M_A$;

generating a first session key $K_B$, the session key $K_B$ being different from the first secret $S_B$, both the session key $K_B$ and the first secret $S_B$ being computed from the second public key $M_A$;

decrypting, using the first secret $S_B$, to retrieve a second random number $N_A$ from the encrypted second random number;

modifying the second random number $N_A$ to obtain a modified second random number;

encrypting the modified second random number with the first session key $K_B$ or the first secret $S_B$ to obtain a first encrypted result;

encrypting the first encrypted result with the other one of the first session key $K_B$ or the first secret $S_B$ to obtain an encrypted random package;

transmitting the encrypted random package from the first computer system to the second computer system.

35. A computer system for performing a cryptographic method through a network, the computer system comprising:

a processor;

a network interface coupled to the network and coupled to the processor, the network interface to receive a request including information on a user identification; and a storage device coupled to the processor, the storage device to store a user password associated with the user identification, and wherein the processor is to perform a method, including generating a first public key $M_B$;

receiving a second public key $M_A$ and an encrypted second random number through the network interface from a second computer system;

generating a first secret $S_B$ by hashing one or more parameters that are known to the first computer system and the second computer system, at least one of the parameters being a result of hashing one or more of the following: a first password $P_B$, a first public key $M_B$, and the second public key $M_A$;

generating a first session key $K_B$, the session key $K_B$ being different from the first secret $S_B$, both the session key $K_B$ and the first secret $S_B$ being computed from the second public key $M_A$;

decrypting, using the first secret $S_B$ and the first session key $K_B$, to retrieve the second random number $N_A$ from the encrypted second random number;

modifying the second random number $N_A$ to obtain a modified second random number;

encrypting the modified second random number with the first session key $K_B$ or the first secret $S_B$ to obtain a first encrypted result;

encrypting the first encrypted result with the other one of the first session key $K_B$ or the first secret $S_B$ to obtain an encrypted random package;

transmitting the encrypted random package through the network interface.

36. The computer system of claim 35 wherein the network is a network operating according to a hypertext transfer protocol; and the first public key $M_B$ is transmitted for session key exchange before the encrypted second random number is received.

* * * * *